(12) United States Patent
Han et al.

(10) Patent No.: US 11,505,563 B2
(45) Date of Patent: Nov. 22, 2022

(54) METAL-LIGAND COMPLEX, CATALYST COMPOSITION FOR ETHYLENE-BASED POLYMERIZATION INCLUDING THE SAME, AND METHOD FOR PREPARING ETHYLENE-BASED POLYMER USING THE SAME

(71) Applicant: SABIC SK NEXLENE COMPANY PTE. LTD., Singapore (SG)

(72) Inventors: Yonggyu Han, Daejeon (KR); Yeonock Oh, Daejeon (KR); Miji Kim, Daejeon (KR); Hyunmin Jang, Daejeon (KR)

(73) Assignee: SABIC SK NEXLENE COMPANY PTE. LTD., Singapore (SG)

( * ) Notice: Subject to any disclaimer, the term of this patent is extended or adjusted under 35 U.S.C. 154(b) by 202 days.

(21) Appl. No.: 16/956,513

(22) PCT Filed: Jun. 25, 2018

(86) PCT No.: PCT/IB2018/054644
§ 371 (c)(1),
(2) Date: Jun. 19, 2020

(87) PCT Pub. No.: WO2019/123028
PCT Pub. Date: Jun. 27, 2019

(65) Prior Publication Data
US 2022/0135599 A1    May 5, 2022

(30) Foreign Application Priority Data

Dec. 21, 2017 (KR) .................. 10-2017-0177345
Jun. 19, 2018 (KR) .................. 10-2018-0070243

(51) Int. Cl.
| C08F 4/76 | (2006.01) |
| C08F 4/64 | (2006.01) |
| C07F 7/00 | (2006.01) |
| C08F 10/02 | (2006.01) |

(52) U.S. Cl.
CPC .............. *C07F 7/00* (2013.01); *C08F 4/64* (2013.01); *C08F 4/64193* (2013.01); *C08F 10/02* (2013.01)

(58) Field of Classification Search
CPC .............. C08F 4/64193; C07F 7/00
See application file for complete search history.

(56) References Cited

U.S. PATENT DOCUMENTS

| 3,594,330 A | 7/1971 | Delbouille et al. | |
| 3,676,415 A | 7/1972 | Diedrich et al. | |
| 8,609,794 B2 * | 12/2013 | Klosin ............... | C08F 4/659 526/170 |
| 9,029,487 B2 * | 5/2015 | Klosin ............... | C08F 210/16 526/172 |
| 9,527,940 B2 * | 12/2016 | Demirors ........... | C08F 210/16 |
| 9,527,941 B2 * | 12/2016 | Demirors ........... | C08F 210/16 |
| 9,605,098 B2 * | 3/2017 | Klosin ............... | C08F 210/16 |
| 9,751,998 B2 * | 9/2017 | Klosin ............... | C07F 7/1804 |
| 9,975,975 B2 * | 5/2018 | Ewart ................ | C07F 7/00 |
| 10,351,646 B2 * | 7/2019 | Fontaine ............ | C08F 210/16 |
| 10,450,394 B2 * | 10/2019 | Fontaine ............ | C08F 236/20 |
| 10,519,260 B2 * | 12/2019 | Fontaine ............ | C07F 7/00 |
| 10,526,431 B2 * | 1/2020 | Fontaine ............ | C08F 210/16 |
| 10,647,797 B2 * | 5/2020 | Fontaine ............ | C08F 210/16 |
| 11,208,502 B2 * | 12/2021 | Patton ................ | C08F 4/545 |
| 11,401,354 B2 * | 8/2022 | Fontaine ............ | C08F 210/16 |
| 2013/0144018 A1 * | 6/2013 | Klosin ............... | C07F 7/00 548/440 |

FOREIGN PATENT DOCUMENTS

| EP | 0320762 A2 | 6/1989 |
| EP | 0372632 A1 | 6/1990 |
| JP | S6392621 A | 4/1988 |
| JP | H0284405 A | 3/1990 |
| JP | 2011122145 A | 6/2011 |
| KR | 20130100140 A | 9/2013 |
| KR | 20140112488 A | 9/2014 |
| KR | 20150100694 A | 9/2015 |
| KR | 20150100844 A | 9/2015 |
| KR | 20150103082 A | 9/2015 |
| RU | 2015134543 A | 2/2017 |
| WO | 2012027448 A1 | 3/2012 |
| WO | 2013101375 A1 | 7/2013 |
| WO | 2014105411 A1 | 7/2014 |
| WO | 2014105412 A1 | 7/2014 |
| WO | 2014105415 A1 | 7/2014 |

OTHER PUBLICATIONS

ISA Korean Intellectual Property Office, International Search Report Issued in Application No. PCT/IB2018/054644, dated Oct. 12, 2018, WIPO, 6 pages.
European Patent Office, Extended European Search Report Issued in Application No. 18892906.1, dated Jun. 1, 2021, Germany, 7 pages.
Intellectual Property India, Office Action Issued in Application No. 202027020196, dated Jul. 27, 2021, 6 pages.
Japanese Patent Office, Office Action Issued in Application No. 2020-530990, dated Apr. 19, 2022, 7 pages.

* cited by examiner

*Primary Examiner* — Rip A Lee
(74) *Attorney, Agent, or Firm* — McCoy Russell LLP

(57) ABSTRACT

Provided are a metal-ligand complex, a catalyst composition for ethylene-based polymerization including the same, and a method for preparing an ethylene-based polymer using the same. Since the metal-ligand complex of the present invention in which a certain functional group is introduced to a certain position has high solubility and catalytic activity, the catalyst composition comprising the same for ethylene-based polymerization including the same may produce an ethylene-based polymer having excellent physical properties.

9 Claims, No Drawings

METAL-LIGAND COMPLEX, CATALYST COMPOSITION FOR ETHYLENE-BASED POLYMERIZATION INCLUDING THE SAME, AND METHOD FOR PREPARING ETHYLENE-BASED POLYMER USING THE SAME

CROSS-REFERENCE TO RELATED APPLICATIONS

The present application is a U.S. National Phase of International Patent Application Serial No. PCT/IB2018/054644 entitled "METAL-LIGAND COMPLEX, CATALYST COMPOSITION COMPRISING SAME FOR ETHYLENEBASED POLYMERIZATION, AND METHOD FOR PREPARING ETHYLENE-BASED POLYMER BY USING SAME," filed on Jun. 25, 2018. International Patent Application Serial No. PCT/IB2018/054644 claims priority to Korean Patent Application No. 10-2017-0177345 filed on Dec. 21, 2017 and Korean Patent Application No. 10-2018-0070243 filed on Jun. 19, 2018. The entire contents of each of the above-referenced applications are hereby incorporated by reference for all purposes.

TECHNICAL FIELD

The present invention relates to a metal-ligand complex, a catalyst composition for ethylene-based polymerization including the same, and a method for preparing an ethylene-based polymer using the same.

BACKGROUND AND SUMMARY

Conventionally, in the preparation of a copolymer of ethylene and α-olefin, or a copolymer of ethylene and olefin-diene, so called, a Ziegler-Natta catalyst having a main catalyst component of a titanium or vanadium compound, and a cocatalyst component of an alkyl aluminum compound have been used.

U.S. Pat. Nos. 3,594,330 and 3,676,415 disclose an improved Ziegler-Natta catalyst. The Ziegler-Natta catalyst system represents high activity to ethylene polymerization, but due to a heterogeneous catalytic active site, there is a demerit in that a generally produced polymer has a broad molecular weight distribution, and in particular a copolymer of ethylene and α-olefin has a non-uniform composition distribution.

Thereafter, there have been conducted various studies on a metallocene catalyst system composed of a metallocene compound of a Group 4 transition metal in the periodic table such as zirconium and hafnium, and methyl aluminoxane as a cocatalyst, which is a homogeneous catalyst having an catalytic active site of a single species, and may produce polyethylene having a narrow molecular weight distribution and a uniform composition distribution, as compared with the conventional Ziegler-Natta catalyst.

For example, European Patent Publication Nos. 320,762 and 372,632, or Japanese Patent Laid-Open Publication Nos. (Sho) 63-092621, (Hei) 02-84405, or (Hei) 03-2347 disclose that a metallocene compound is activated with cocatalyst methyl aluminoxane in $Cp_2TiCl_2$, $Cp_2ZrCl_2$, $Cp_2ZrMeCl$, $Cp_2ZrMe_2$, ethylene$(IndH_4)_2ZrCl_2$ and the like to polymerize ethylene with high activity, thereby producing polyethylene having a molecular weight distribution (Mw/Mn) in a range of 1.5-2.0.

However, it is difficult to obtain a high molecular polymer with the catalyst system.

That is, it is known that when the catalyst system is applied to a solution polymerization method carried out at high temperature, polymerization activity is rapidly decreased, and a β-dehydrogenation reaction is predominant, thereby making the catalyst system unsuitable for preparing a high molecular polymer.

Meanwhile, there have been conducted various studies to improve solubility of a catalyst in an aliphatic hydrocarbon so that catalytic efficiency is maximized in a commercial process, and a catalyst transport volume is decreased to greatly increase storage and transport costs in the process. In addition, as a concentration of a catalyst is limited, catalyst poisoning due to natural occurrence of impurities in a solvent becomes a bigger problem.

Accordingly, there are currently needed a catalyst and a catalyst precursor having improved characteristics which are still required in the chemical industry.

RELATED ART DOCUMENT

Patent Document (Patent Document 1) U.S. Pat. No. 3,594,330
(Patent Document 2) U.S. Pat. No. 3,676,415
(Patent Document 3) European Patent Publication No. 320,762.
(Patent Document 4) European Patent Publication No. 372,632.
(Patent Document 5) Japanese Patent Laid-Open Publication No. (Sho) 63-092621
(Patent Document 6) Japanese Patent Laid-Open Publication No. (Hei) 02-84405
(Patent Document 7) Japanese Patent Laid-Open Publication No. (Hei) 03-2347

DISCLOSURE

Technical Problem

An object of the present invention is to provide a metal-ligand complex having a certain substituent and a catalyst composition for ethylene-based polymerization including the same.

Another object of the present invention is to provide a method for preparing an ethylene-based polymer using the catalyst composition for ethylene-based polymerization.

Technical Solution

In one general aspect, a metal-ligand complex having a significantly improved solubility in an organic solvent, in particular an aliphatic hydrocarbon is represented by the following Chemical Formula 1:

[Chemical Formula 1]

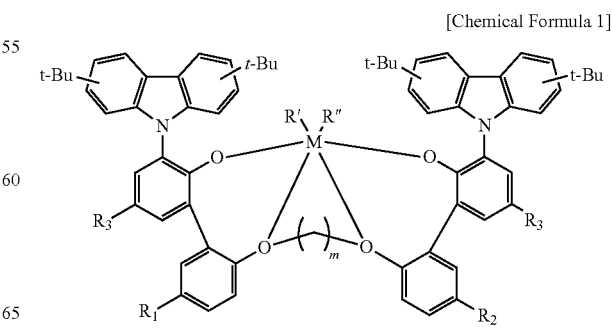

wherein

M is a Group 4 transition metal in the periodic table;

R' and R" are independently of each other (C1-C20) alkyl;

$R_1$ and $R_2$ are independently of each other halogen, (C1-C20) alkyl, (C1-C20) alkoxy or halo (C1-C20) alkyl;

$R_3$ is a straight chain (C8-C20) alkyl; and m is an integer of 2 to 4.

Preferably, in Chemical Formula 1 according to an exemplary embodiment of the present invention, $R_3$ may be straight chain (C8-C20) alkyl.

More preferably, in Chemical Formula 1 according to an exemplary embodiment of the present invention, $R_3$ may be straight chain (C8-C20) alkyl, M may be titanium, zirconium or hafnium, R' and R" may be independently of each other (C1-05) alkyl, $R_1$ and $R_2$ may be identical to each other halogen, (C1-C8) alkyl or (C1-C8) alkoxy, and m may be an integer of 3.

Preferably, Chemical Formula 1 according to an exemplary embodiment of the present invention may be represented by the following Chemical Formula 2:

[Chemical Formula 2]

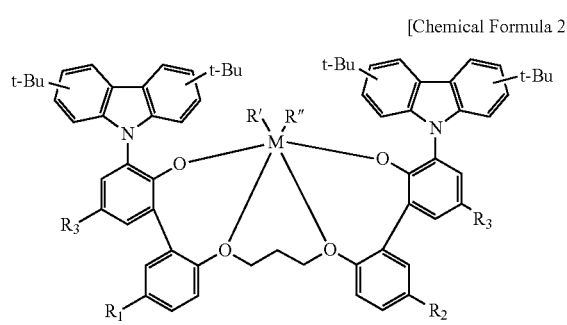

wherein

M is titanium, zirconium or hafnium;

R' and R" are independently of each other (C1-05) alkyl;

$R_1$ and $R_2$ are independently of each other halogen, (C1-C8) alkyl or (C1-C8) alkoxy; and $R_3$ is a straight chain (C8-C12) alkyl.

In another general aspect, a catalyst composition for ethylene-based polymerization includes the metal-ligand complex of the present invention and a cocatalyst.

Preferably, the cocatalyst according to an exemplary embodiment of the present invention may be an aluminum compound cocatalyst, a boron compound cocatalyst or a mixture thereof, and may be used at 0.5 to 10000 moles relative to 1 mol of the metal-ligand complex.

In still another general aspect, a method for preparing an ethylene-based polymer includes: polymerizing ethylene or ethylene and α-olefin in the presence of the catalyst composition for ethylene-based polymerization to prepare an ethylene-based polymer.

Preferably, the polymerization according to an exemplary embodiment of the present invention may be performed at 170 to 250° C.

Advantageous Effects

The metal-ligand complex according to an exemplary embodiment of the present invention has significantly improved solubility in a solvent by introducing a certain functional group having the controlled number of carbons and a controlled shape, thereby improving a polymerization process more efficiently.

Besides, the metal-ligand complex according to an exemplary embodiment of the present invention has excellent activity of the catalyst by introducing a certain functional group to a certain position, and furthermore, enables polymerization even at a high polymerization temperature, and does not decrease activity of the catalyst.

In addition, the metal-ligand complex according to an exemplary embodiment of the present invention has good reactivity with olefins to easily polymerize olefins, and may produce an ethylene-based polymer having a high molecular weight at a high polymerization temperature.

Accordingly, the metal-ligand complex according to an exemplary embodiment of the present invention and the catalyst composition including the same may be very useful for preparing an ethylene-based polymer having excellent physical properties.

BEST MODE

Hereinafter, the metal-ligand complex of the present invention, a catalyst composition for ethylene-based polymerization including the same, and a method for preparing an ethylene-based polymer using the same will be described, however, technical terms and scientific terms used herein have the general meaning understood by those skilled in the art to which the present invention pertains unless otherwise defined, and a description for the known function and configuration obscuring the present invention will be omitted in the following description.

"Alkyl", "alkoxy" and other substituents containing an "alkyl" moiety described herein include both straight chain or branched chain forms, and unless otherwise indicated, have 1 to 20 carbon atoms, preferably 1 to 15, more preferably 1 to 10 carbon atoms.

In addition, "(C8-C20) alkyl containing one or more of a nitrogen atom, an oxygen atom, a sulfur atom and a phosphorus atom" is a substituent containing one or more of a nitrogen atom, an oxygen atom, a sulfur atom and a phosphorus atom in an alkyl group having 8 to 20 carbon atoms, wherein the nitrogen atom, the oxygen atom, the sulfur atom and the phosphorus atom may be present between carbons of the alkyl group, or as the substituent of the alkyl group. As an example, alkoxy, aminoalkyl, secondary amines, ether compounds and the like may be mentioned, but not limited thereto.

A haloalkyl described herein is an alkyl group in which one or more hydrogens are substituted with halogen, and may contain one or more halogens in the alkyl group.

The present invention provides a metal-ligand complex represented by the following Chemical Formula 1, which has improved solubility, excellent thermal stability and high catalytic activity at a high polymerization temperature, by introducing a substituent having a controlled shape and the controlled number of carbons to a certain position, and thus, may be very useful for high molecular weight ethylene-based polymerization.

[Chemical Formula 1]

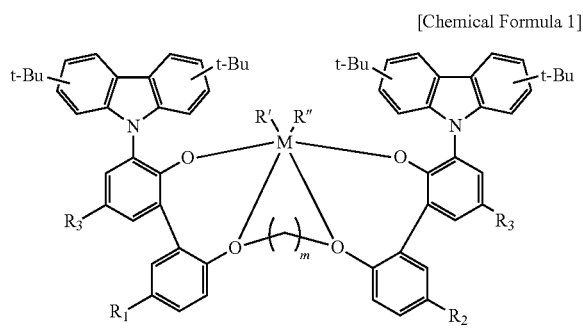

wherein

M is a Group 4 transition metal in the periodic table;
R' and R" are independently of each other (C1-C20) alkyl;
$R_1$ and $R_2$ are independently of each other halogen, (C1-C20) alkyl, (C1-C20) alkoxy or halo(C1-C20) alkyl;
$R_3$ is a straight chain (C8-C20) alkyl; and
m is an integer of 2 to 4.

The metal-ligand complex according to an exemplary embodiment of the present invention is represented by the above Chemical Formula 1, and by introducing straight chain (C8-C20) alkyl which is an intentionally controlled sub stituent to $R_3$ in Chemical Formula 1, solubility in an organic solvent, in particular, an aliphatic hydrocarbon is significantly improved, and catalytic activity is very high even at a high polymerization temperature.

Accordingly, the metal-ligand complex according to an exemplary embodiment of the present invention has excellent thermal stability to maintain high catalytic activity even at high temperature, and also has good polymerization reactivity with other olefins, and may produce a high molecular polymer in high yield, and thus, has high commercial practicality as compared with metallocene and non-metallocene-based catalysts having a single active site which are already known.

Preferably, in Chemical Formula 1 according to an exemplary embodiment of the present invention, $R_3$ may be straight chain (C8-C20) alkyl, more preferably straight chain (C8-C12) alkyl.

Preferably, in Chemical Formula 1 according to an exemplary embodiment of the present invention, $R_3$ may be straight chain (C8-C20) alkyl, M may be titanium, zirconium or hafnium, R' and R" may be independently of each other (C1-05) alkyl, $R_1$ and $R_2$ may be identical to each other halogen, (C1-C8) alkyl or (C1-C8) alkoxy, and m may be an integer of 3.

In terms of improving solubility, catalytic activity and reactivity with olefins, Chemical Formula 1 according to an exemplary embodiment of the present invention may be preferably represented by the following Chemical Formula 2:

[Chemical Formula 2]

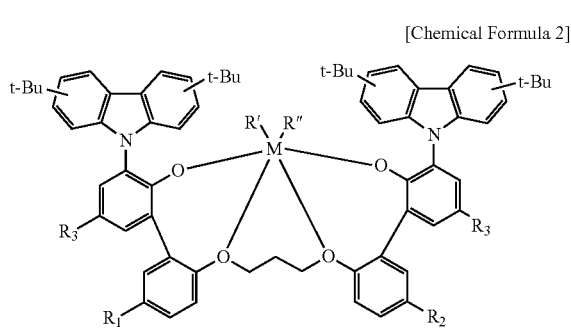

wherein

M is titanium, zirconium or hafnium;
R' and R" are independently of each other (C1-C5) alkyl;
$R_1$ and $R_2$ are independently of each other halogen, (C1-C8) alkyl or (C1-C8) alkoxy; and $R_3$ is a straight chain (C8-C12) alkyl.

In terms of having higher solubility, catalytic activity and reactivity with olefins, $R_3$ in Chemical Formula 2 according to an exemplary embodiment of the present invention may be preferably straight chain (C8-C12) alkyl, and more preferably n-octyl, n-nonyl, n-decyl, n-undecyl or n-dodecyl.

Specifically, the metal-ligand complex according to an exemplary embodiment of the present invention may be compounds selected from the group consisting of the following structure, but not limited thereto:

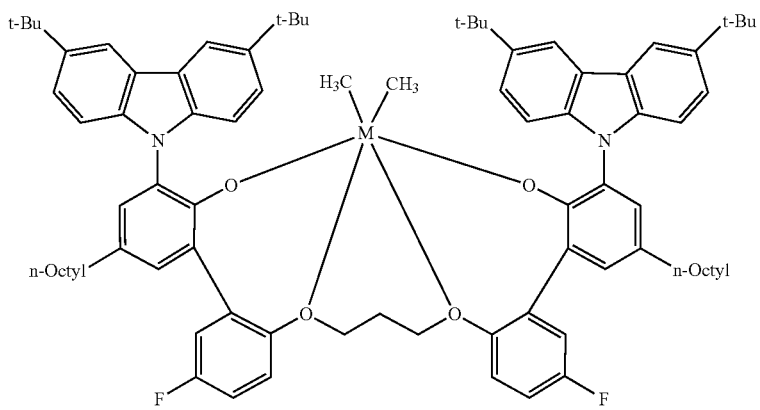

-continued
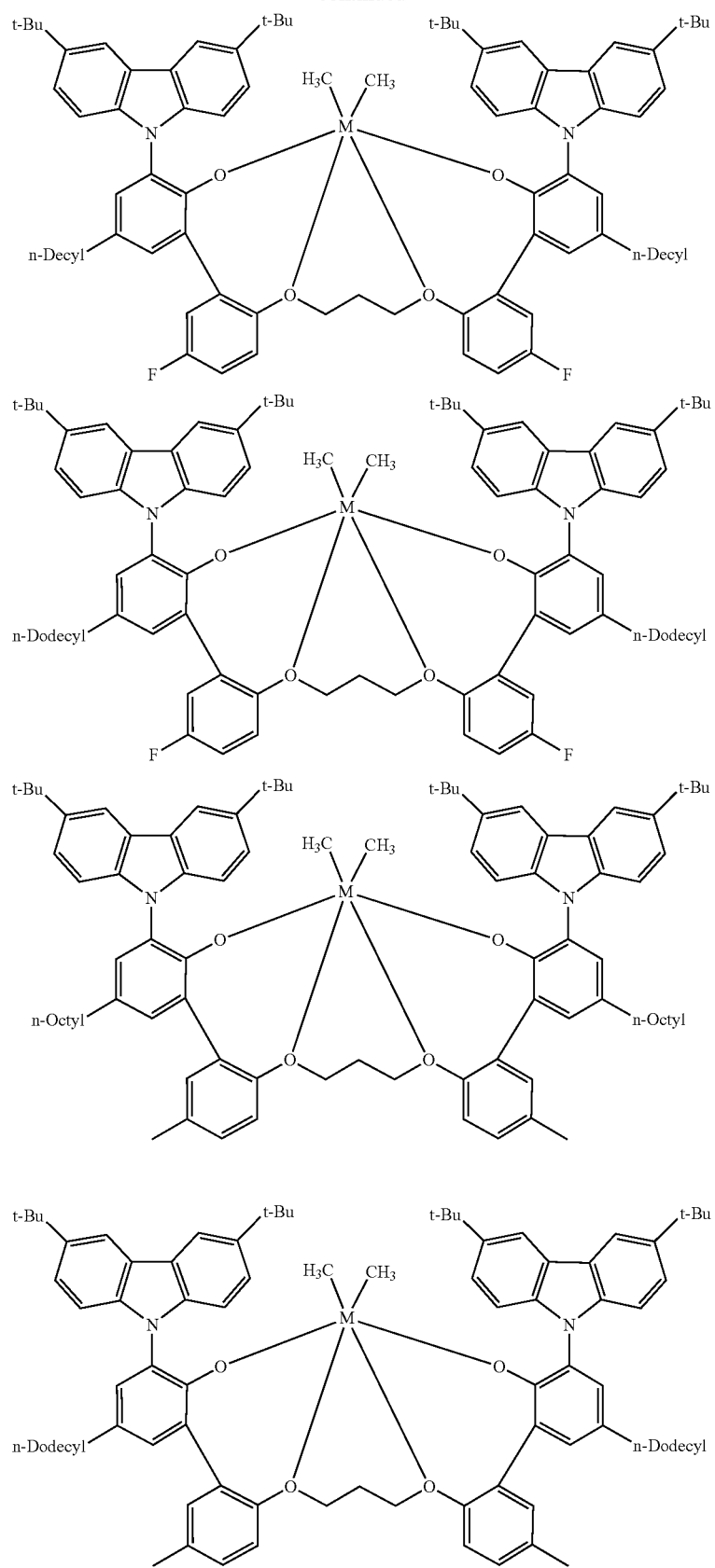

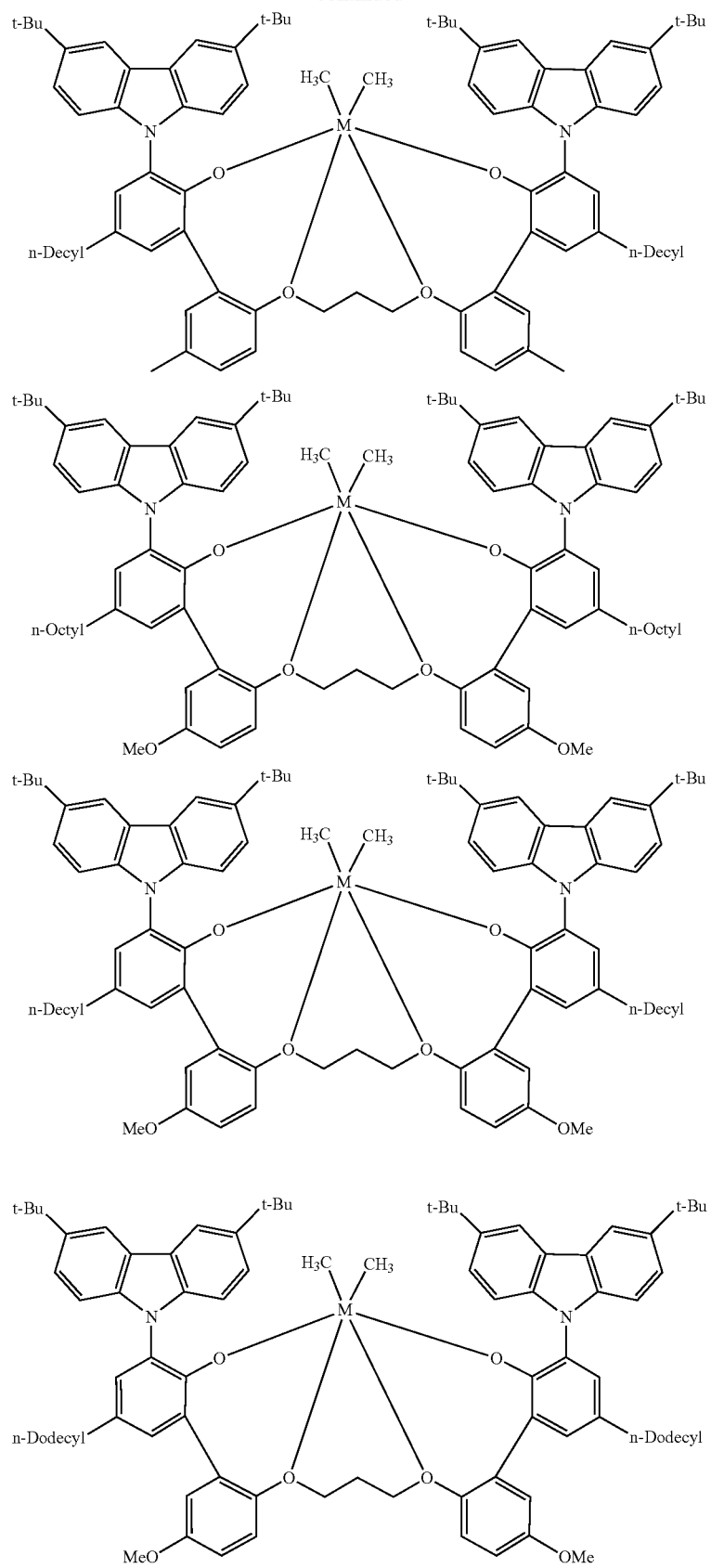

-continued
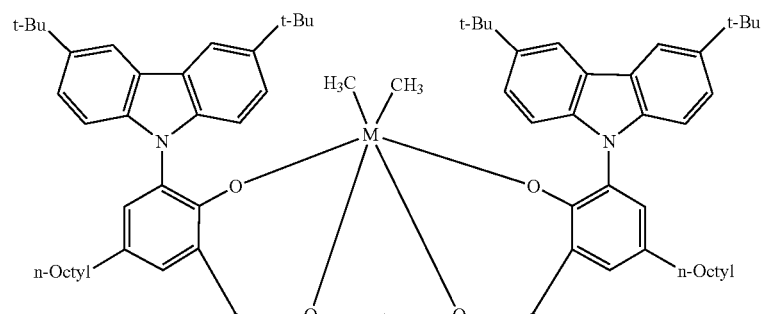
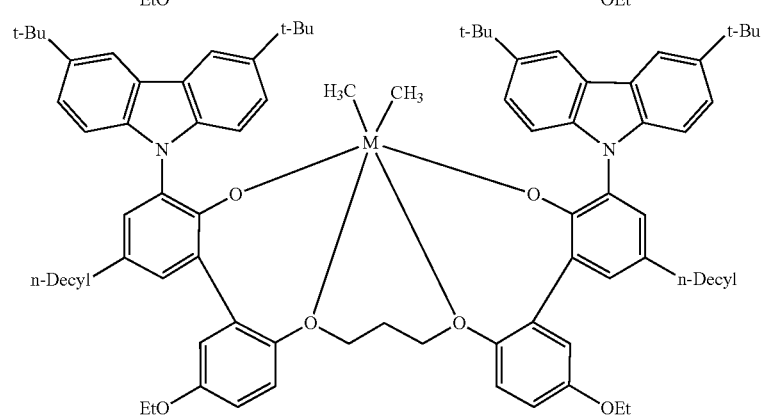
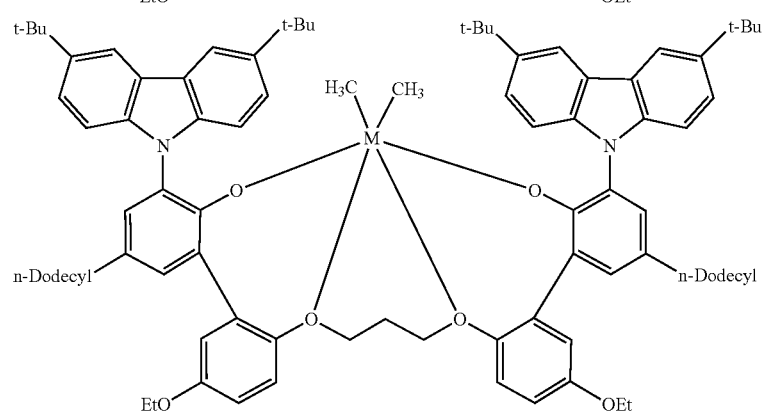
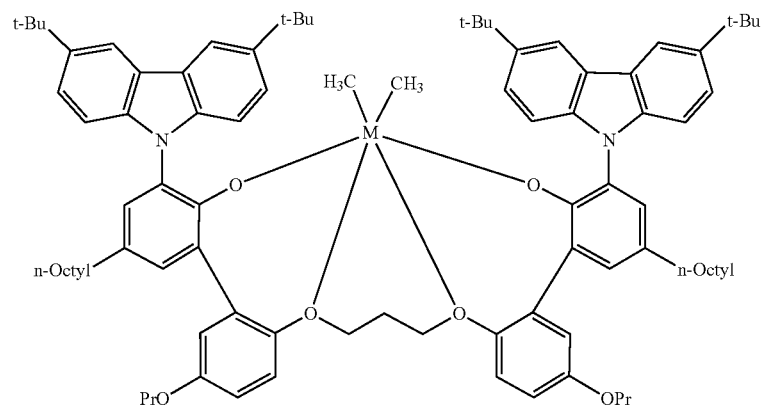

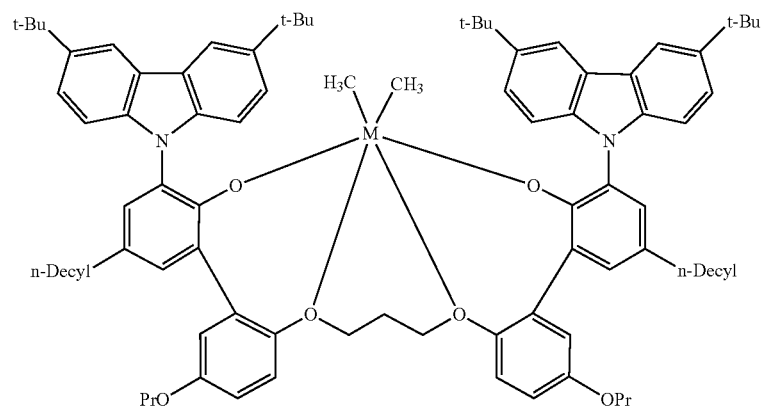
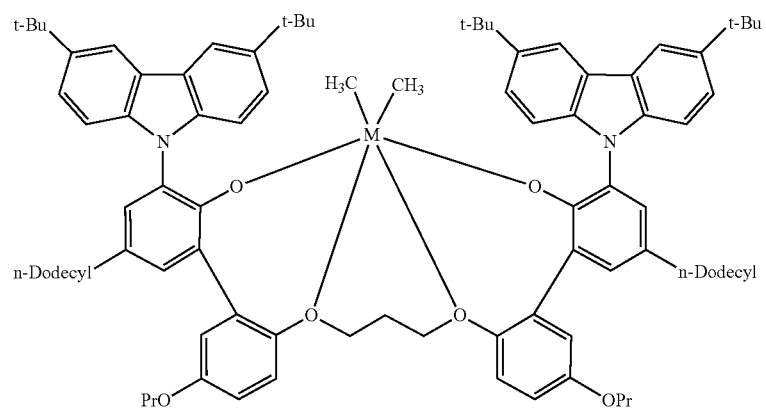
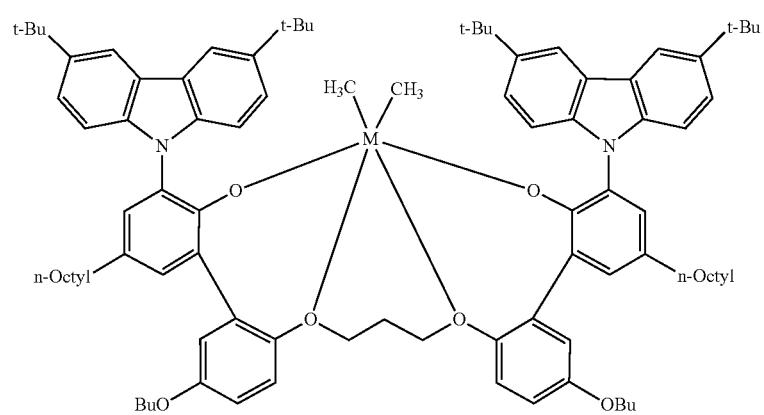
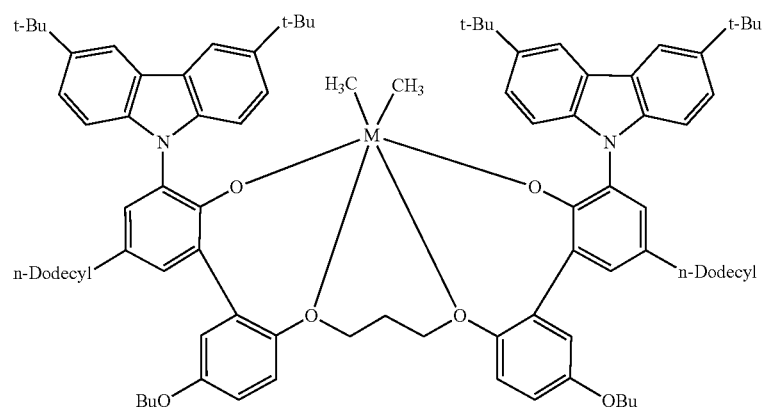

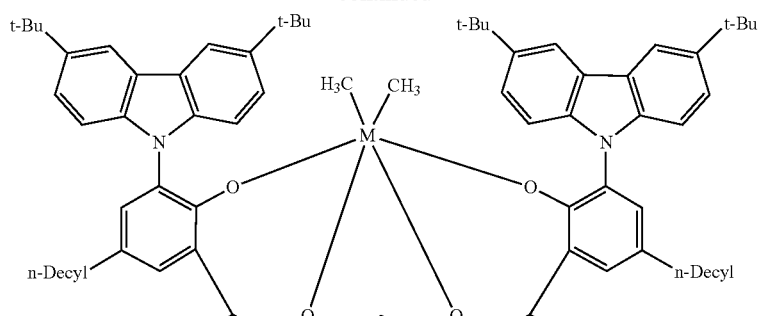
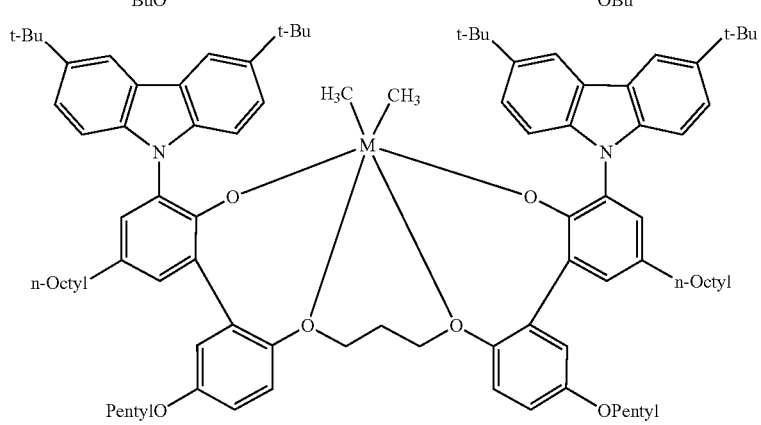
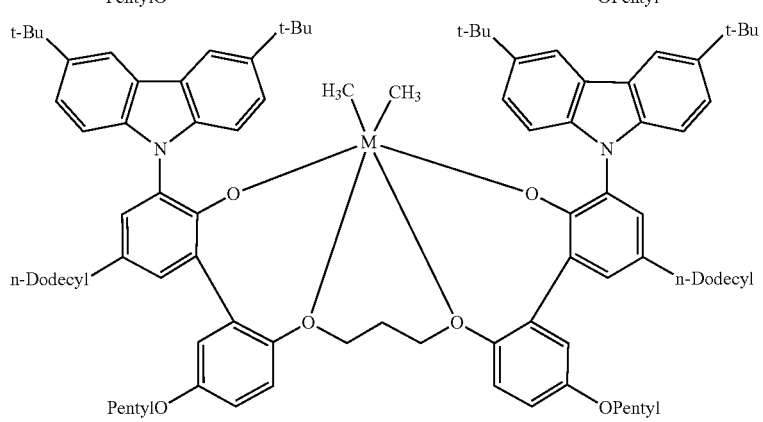
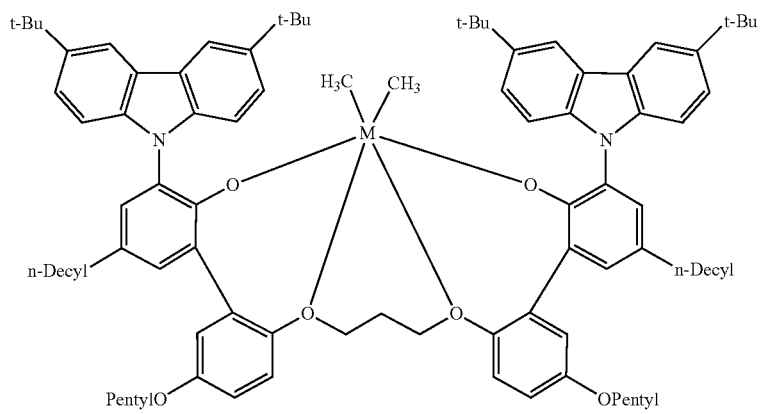

-continued
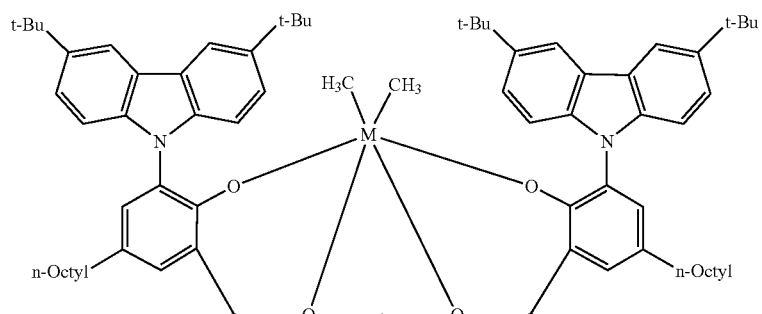
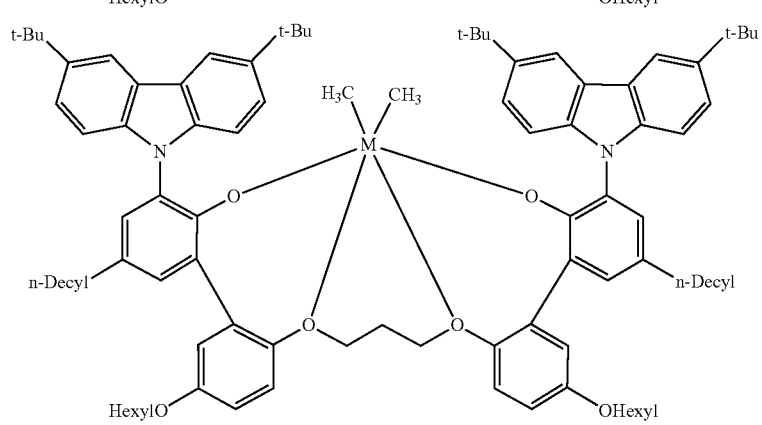
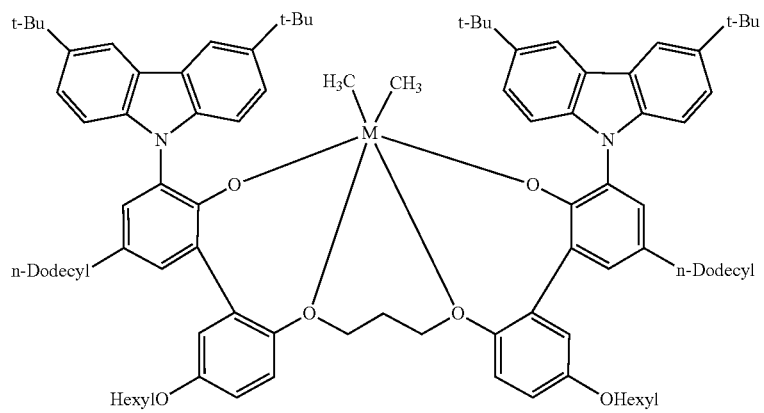
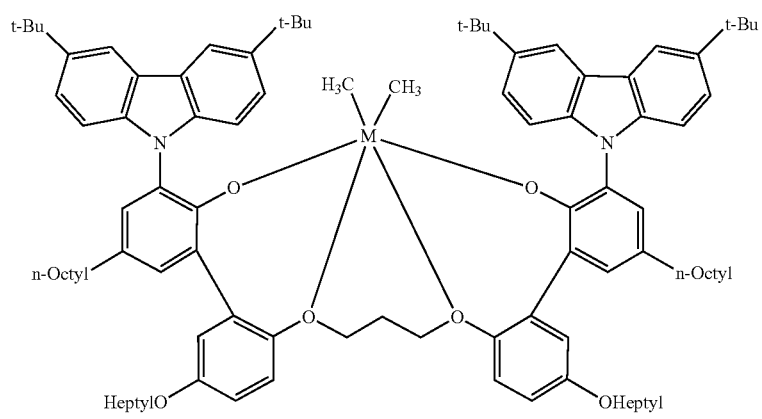

-continued
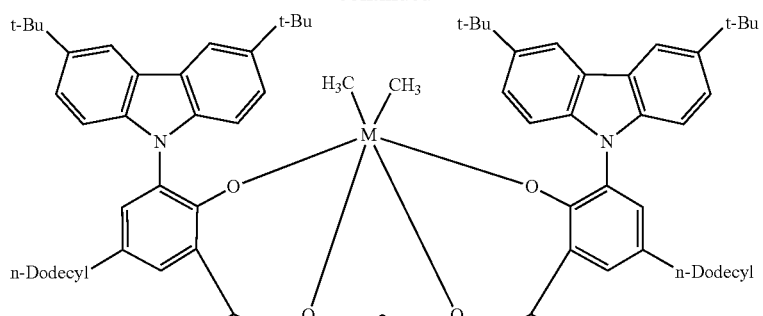
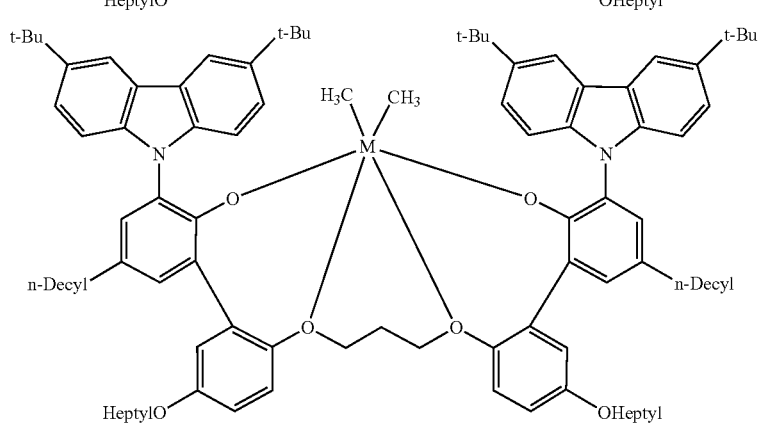
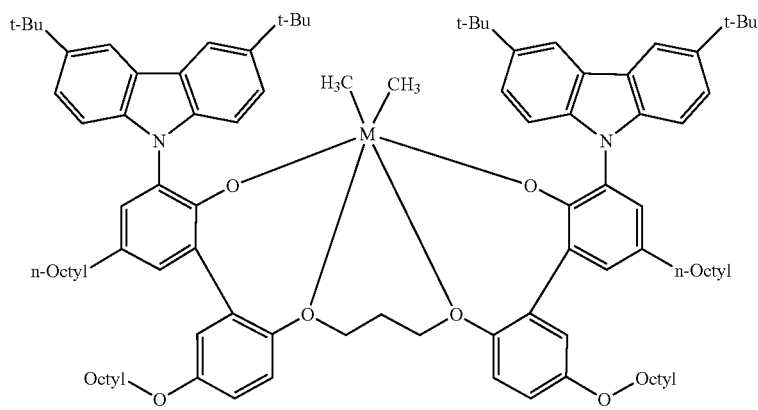
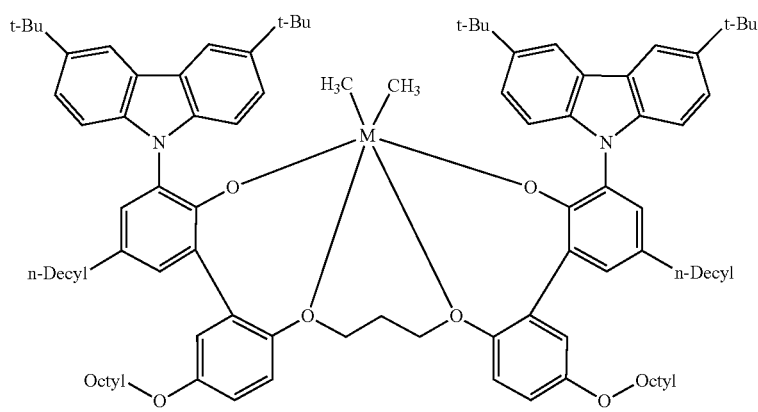

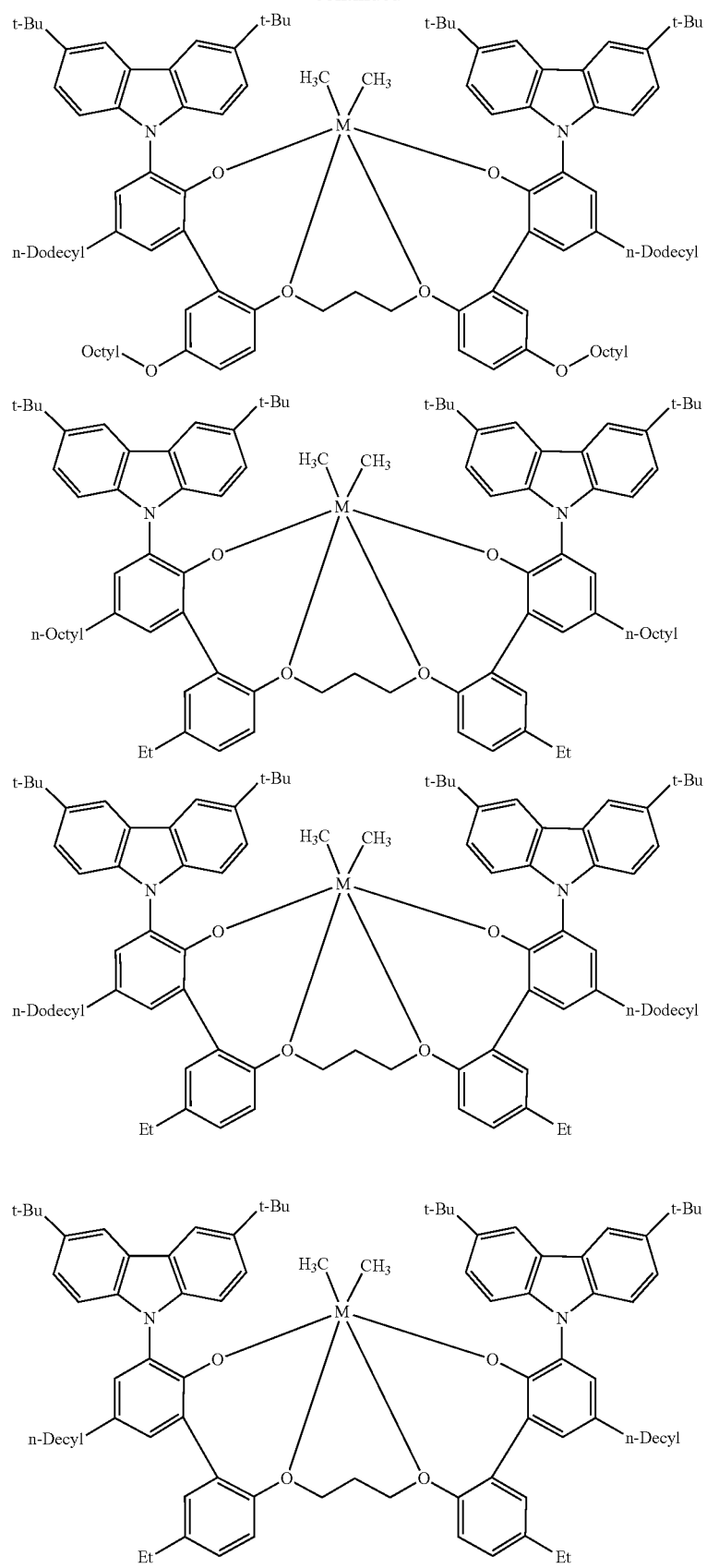

-continued
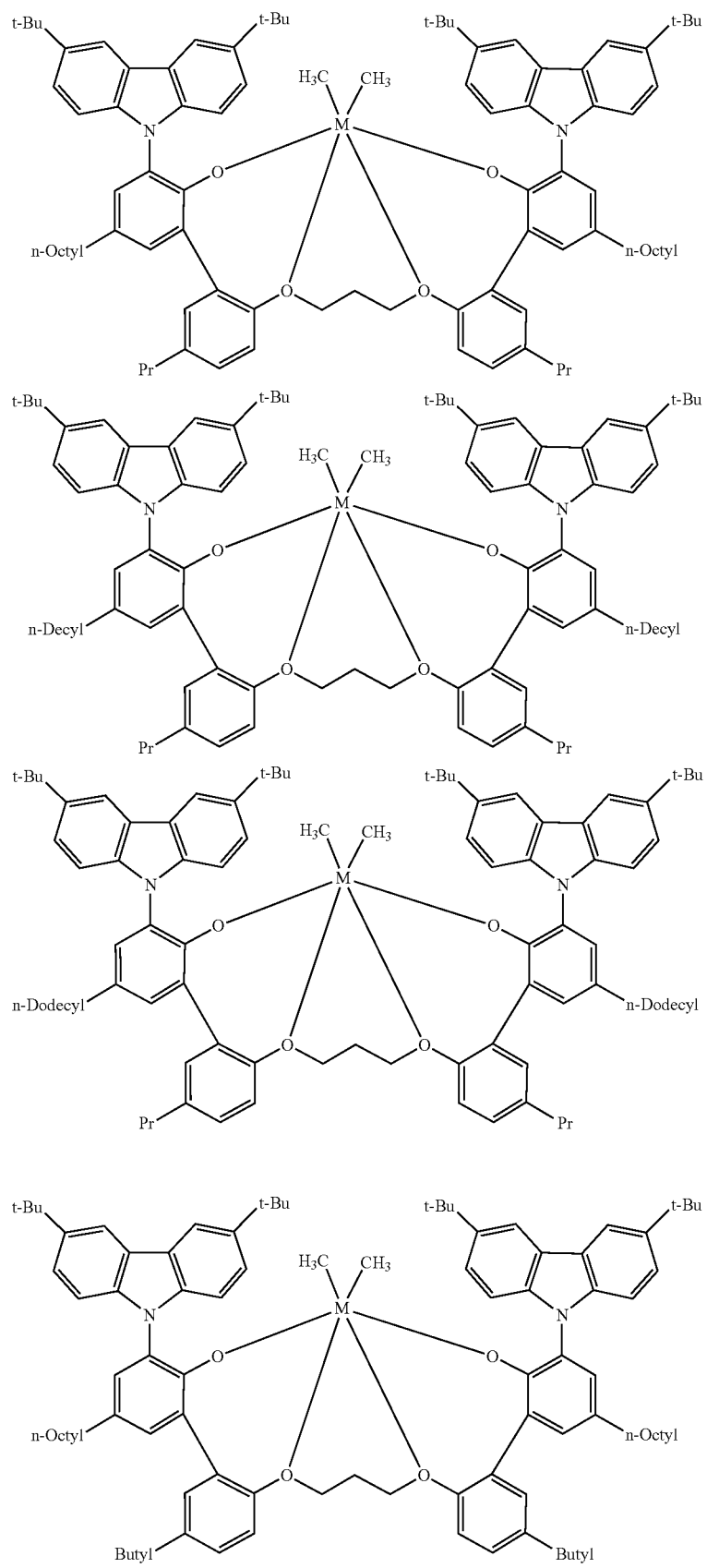

-continued
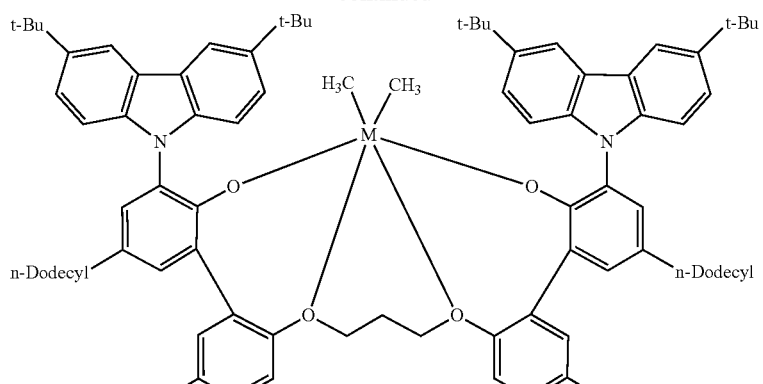
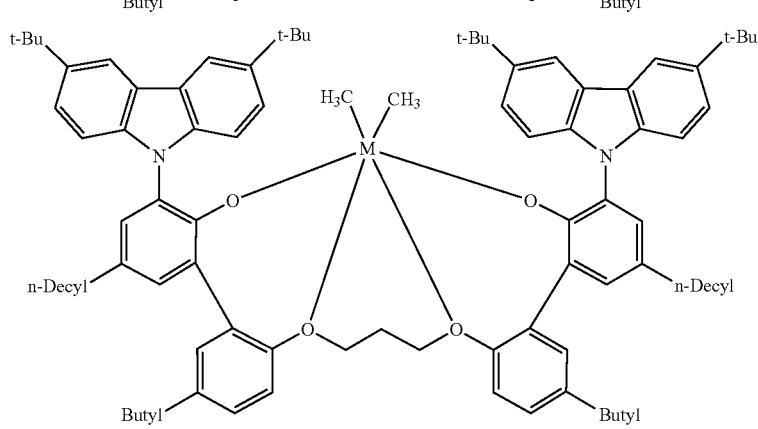
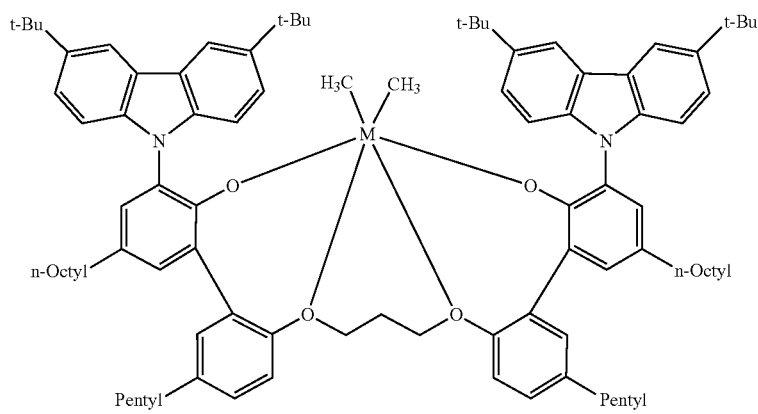
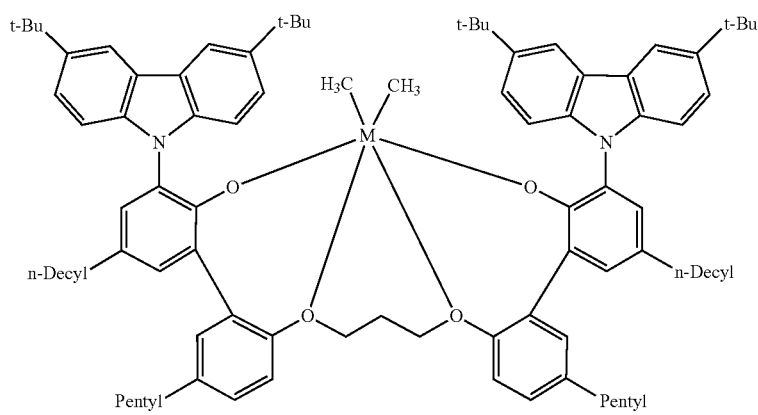

-continued
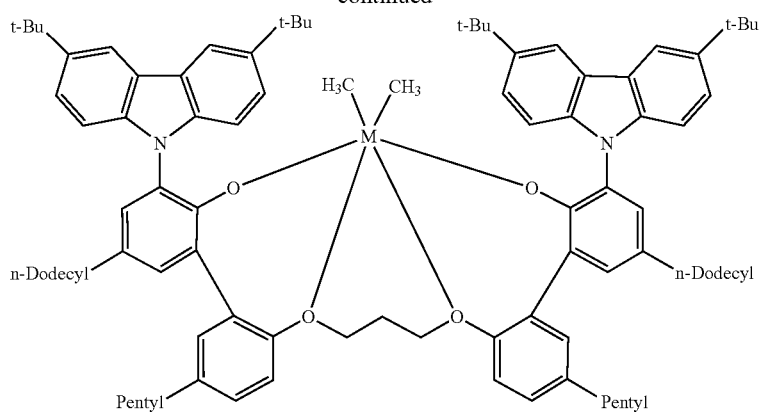
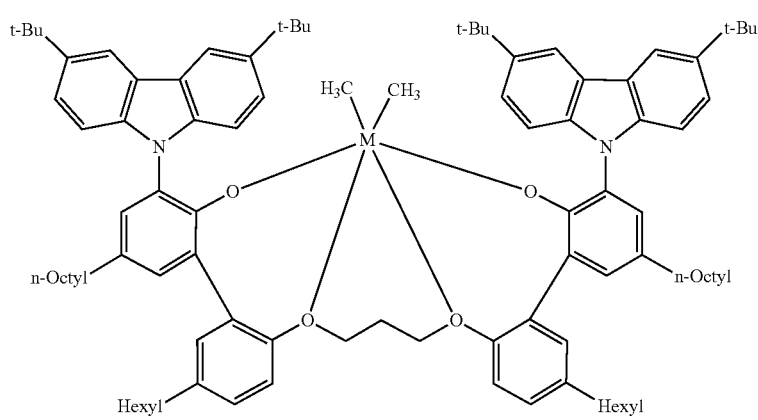
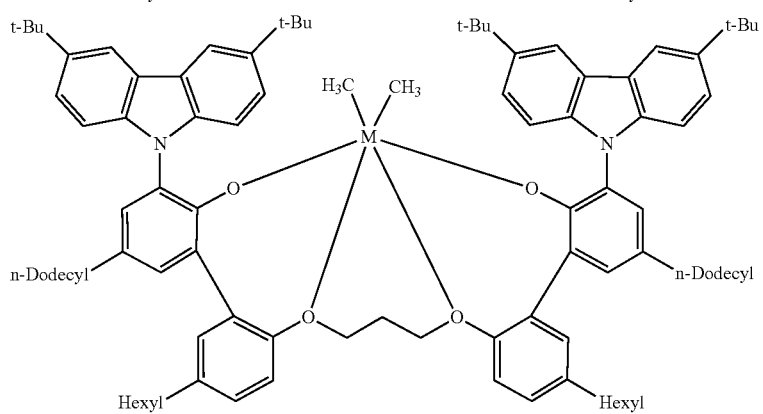
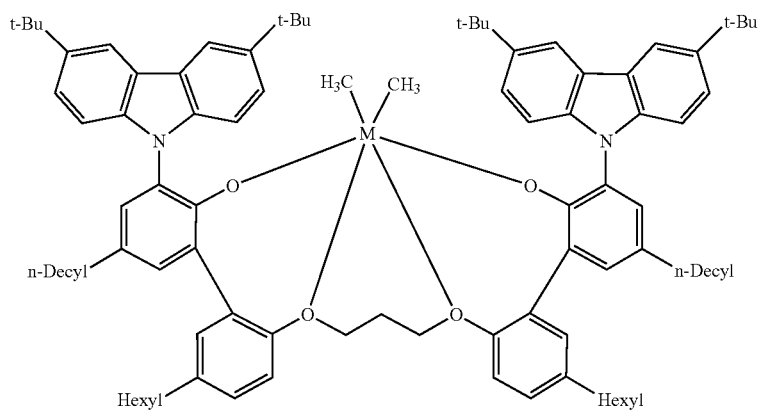

-continued
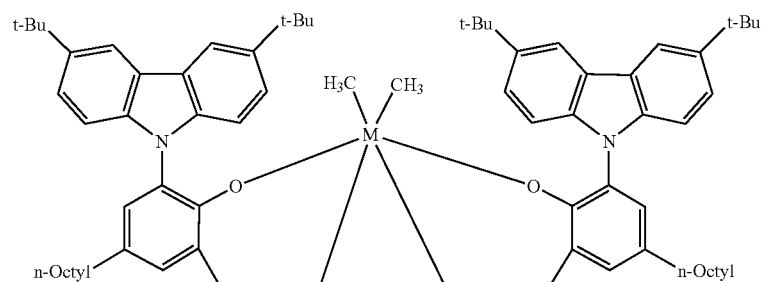
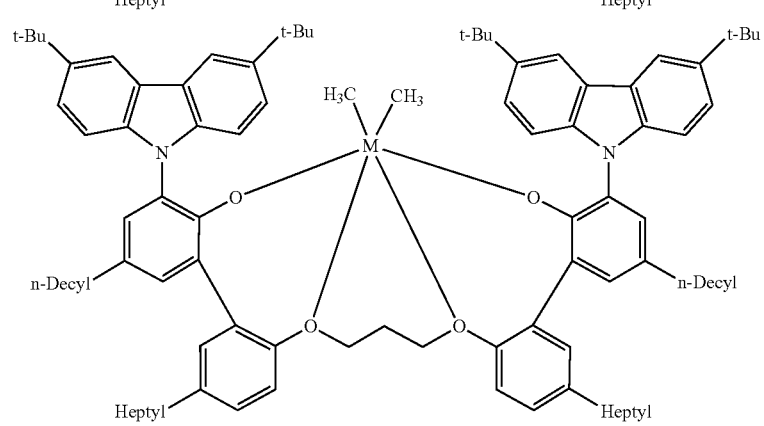
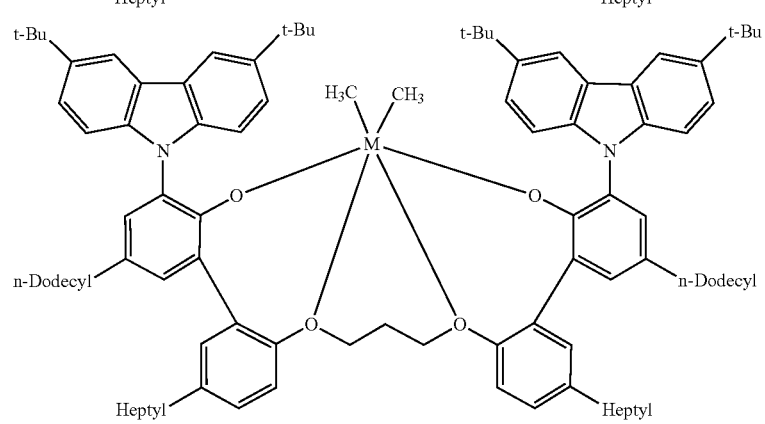
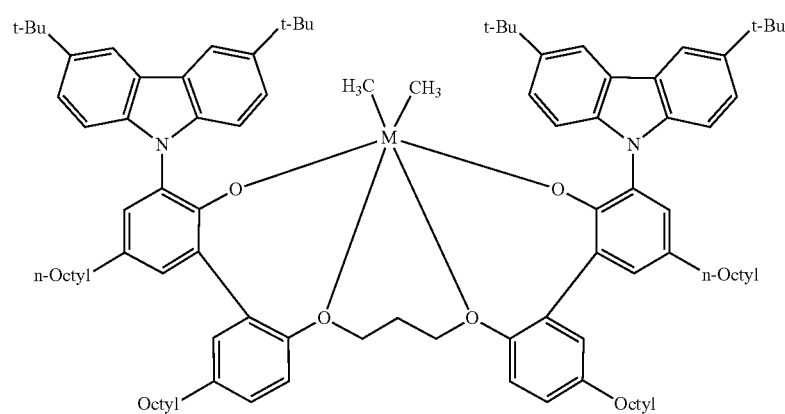

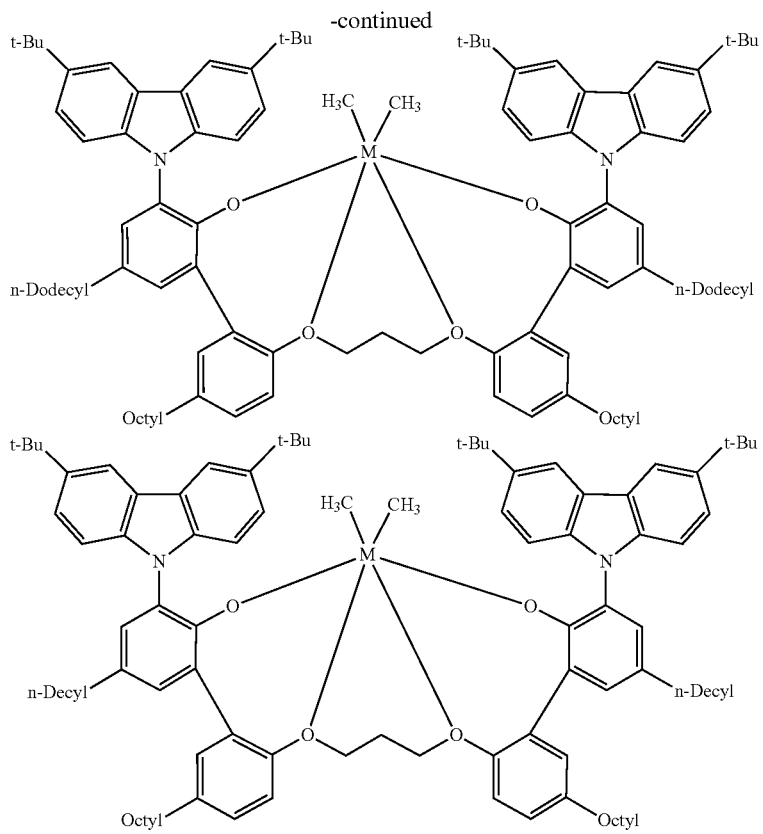

wherein M is titanium, zirconium or hafnium; and PrO-, BuO-, PentylO-, HexylO-, HeptylO-, OctylO-, Pr-, Butyl-, Pentyl-, Hexyl-, Heptyl- and Octyl-include both straight chain and branched chain forms.

In addition, the present invention provides a catalyst composition for ethylene-based polymerization including the metal-ligand complex of the present invention and a cocatalyst.

The cocatalyst according to an exemplary embodiment of the present invention may be a boron compound cocatalyst, an aluminum compound cocatalyst and a mixture thereof.

The cocatalyst according to an exemplary embodiment of the present invention may be included at a mole ratio of 0.5 to 10000 relative to 1 mole of the metal-ligand complex.

The boron compound which may be used as the cocatalyst in the present invention may include the boron compounds known in U.S. Pat. No. 5,198,401, and specifically, may be selected from the group consisting of the compounds represented by the following Chemical Formulae 11 to 13.

$B(R^{21})_3$      [Chemical Formula 11]

$[R^{22}]^+[B(R^{21})_4]^-$      [Chemical Formula 12]

$[(R^{23})_pZH]^+[B(R^{21})_4]^-$      [Chemical Formula 13]

wherein B is a boron atom; $R^{21}$ is a phenyl group, and the phenyl group may be further substituted by 3 to 5 substituents selected from the group consisting of a fluorine atom, a (C1-C20) alkyl group, a (C1-C20) alkyl group substituted by a fluorine atom, a (C1-C20) alkoxy group or a (C1-C20) alkoxy group substituted by a fluorine atom; $R^{22}$ is (C5-C7) aromatic radical or (C1-C20) alkyl(C6-C20)aryl radical, (C6-C20)aryl(C1-C20) alkyl radical, for example, a triphenylmethylium radical; Z is a nitrogen or phosphorus atom; $R^{23}$ is an (C1-C20) alkyl radical or an anilinium radical substituted with two (C1-C20) alkyl groups together with a nitrogen atom; and p is an integer of 2 or 3.

Preferred examples of the boron-based cocatalyst may include trityl tetrakis(pentafluorophenyl)borate, tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,2,4-trifluorophenyl)borate, phenylbis(pentafluorophenyl)borate or tetrakis(3,5-bistrifluoromethylphenyl)borate. In addition, certain combination examples thereof may include ferrocenium tetrakis(pentafluorophenyl)borate, 1,1'-dimethylferrocenium tetrakis (pentafluorophenyl)borate, silver tetrakis(pentafluorophenyl)borate, triphenylmethylium tetrakis(pentafluorophenyl)borate, triphenylmethylium tetrakis(3,5-bistrifluoromethylphenyl)borate, triethylammonium tetrakis (pentafluorophenyl)borate, tripropylammonium tetrakis (pentafluorophenyl)borate, tri(n-butyl)ammonium tetrakis (pentafluorophenyl)borate, tri(n-butyl)ammonium tetrakis (3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl) borate, N,N-dimethylanilinium tetrakis(3,5-bistrifluoromethylphenyl)borate, diiso propylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, or tri(dimethylphenyl)phosphonium tetrakis(pentafluorophenyl)borate, and among them, the most preferred are any one or two or more selected from the group consisting of triphenylmethylium tetrakis(pentafluorophenyl)borate, N,N-dimethylanilinium tetrakispentafluorophenylborate, triphenylmethylium tetrakispentafluorophenylborate and trispentafluoroborane.

An example of an aluminum compound which may be used as the cocatalyst in the catalyst composition according to an exemplary embodiment of the present invention may include an aluminoxane compound of Chemical Formula 14 or 15, an organoaluminum compound of Chemical Formula 16, or an organoaluminum alkyloxide or an organoaluminum aryloxide compound of Chemical Formula 17 or 18:

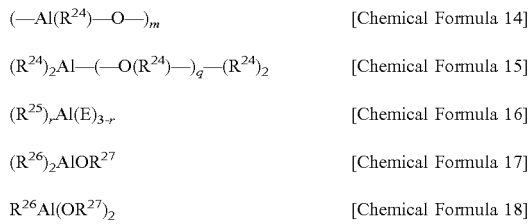

| (—Al($R^{24}$)—O—)$_m$ | [Chemical Formula 14] |
| $(R^{24})_2$Al—(—O($R^{24}$)—)$_q$—$(R^{24})_2$ | [Chemical Formula 15] |
| $(R^{25})_r$Al(E)$_{3-r}$ | [Chemical Formula 16] |
| $(R^{26})_2$AlO$R^{27}$ | [Chemical Formula 17] |
| $R^{26}$Al(O$R^{27}$)$_2$ | [Chemical Formula 18] | wherein $R_{24}$ is a (C1-C20) alkyl group, preferably a methyl group or an isobutyl group; m and q are independently of each other an integer of 5 to 20; $R_{25}$ and $R_{26}$ are independently of each other (C1-C20) alkyl group; E is a hydrogen atom or a halogen atom; r is an integer of 1 to 3; and $R_{27}$ is an (C1-C20) alkyl group or a (C6-C30)aryl group.

Specific examples of the compound which may be used as the aluminum compound may include aluminoxane compounds such as methylaluminoxane, modified methylaluminoxane and tetraisobutylaluminoxane; organoaluminum compounds, for example, trialkylaluminum such as trimethylaluminum, triethylaluminum, tripropylaluminum, triisobutylaluminum and trihexylaluminum; dialkylaluminumchloride such as dimethylaluminumchloride, diethylaluminumchloride, dipropylaluminum chloride, diisobutylaluminumchloride and dihexylaluminumchloride; alkylaluminumdichloride such as methylaluminumdichloride, ethylaluminumdichloride, prop ylaluminumdichloride, isobutylaluminumdichloride and hexylaluminumdichloride; dialkylaluminumhydride such as dimethylaluminumhydride, diethylaluminumhydride, dipropylaluminumhydride, diisobutylaluminumhydride and dihexylaluminumhydride; alkylalkoxyaluminum such as methyldimethoxyaluminum, dimethylmethoxyaluminum, ethyldiethoxyaluminum, diethylethoxyaluminum, isobutyldibuthoxyaluminum, diisobutylbutoxyaluminum, hexyldimethoxyaluminum, dihexylmethoxyaluminum and dioctylmethoxyaluminum, preferably a compound selected from the group consisting of methylaluminoxane, modified methylaluminoxane, tetraisobutylaluminoxane, trialkylaluminum, triethylaluminum and triisobutylaluminum alone or in combination thereof, more preferably trialkylaluminum, still more preferably triethylaluminum and triisobutylaluminum.

Preferably, in the catalyst composition according to an exemplary embodiment of the present invention, when the aluminum compound is used as the cocatalyst, as a preferred range of the ratio between the metal-ligand complex of the present invention and the cocatalyst, the ratio of a transition metal (M):an aluminum atom (Al) may be 1:50 to 1:5,000, based on the mole ratio.

Preferably, in the catalyst composition according to an exemplary embodiment of the present invention, when both the aluminum compound and the boron compound are used as the cocatalyst, as a preferred range of the ratio between the metal-ligand complex of the present invention and the cocatalyst, a ratio of a transition metal (M):a boron atom: an aluminum atom may be 1:0.1 to 100:10 to 1,000, more preferably 1:0.5 to 5:25 to 500, based on the mole ratio.

As another aspect according to an exemplary embodiment of the present invention, a method for preparing an ethylene polymer using the catalyst composition for ethylene-based polymerization may be conducted by contacting the metal-ligand complex, the cocatalyst and ethylene, and if necessary, a vinyl-based comonomer, in the presence of an appropriate organic solvent. Here, a precatalyst component which is the metal-ligand complex and the cocatalyst component may be added to a reactor separately, or each component may be mixed previously and added to a reactor, and mixing conditions such as an addition order, temperature or concentration is not particularly limited.

A preferred organic solvent which may be used in the preparation method may be C3-C20 hydrocarbons, and specific examples thereof may include butane, isobutane, pentane, hexane, heptane, octane, isooctane, nonane, decane, dodecane, cyclohexane, methylcyclohexane, benzene, toluene, xylene and the like.

Specifically, when a copolymer of ethylene and α-olefin is prepared, C3 to C18 α-olefins may be used as a comonomer together with ethylene, and preferably the α-olefins may be selected from the group consisting of propylene, 1-butene, 1-pentene, 4-methyl-1-pentene, 1-hexene, 1-octene, 1-decene, 1-dodecene, 1-hexadecene and 1-octadecene. More preferably, 1-butene, 1-hexene, 1-octene or 1-decene and ethylene may be copolymerized. In this case, the preferred pressure of ethylene and polymerization reaction temperature may be a pressure of 1 to 1000 atm, more preferably 10 to 150 atm, and for an effective polymerization reaction, a polymerization reaction temperature of 170 to 250° C., preferably 180 to 200° C.

In addition, the copolymer prepared according to the method of the present invention usually contains 50 wt % or more, preferably 60 wt % or more, and more preferably 60 to 99 wt % of ethylene.

As described above, linear low density polyethylene (LLDPE) prepared using C4-C10 α-olefins as a comonomer has a density range of 0.940 g/cc or less, and may be extended to the range of very low density polyethylene (VLDPE) or ultra-low density polyethylene (ULDPE) having a density of 0.900 g/cc, or an olefin elastomer. In addition, when the ethylene copolymer is prepared according to the present invention, hydrogen may be used as a molecular weight regulator for adjusting the molecular weight, and the copolymer usually has a weight average molecular weight (Mw) of 80,000 to 500,000.

An ethylene-propylene-diene copolymer as a specific example of the olefin-diene copolymer prepared by the catalyst composition according to an exemplary embodiment of the present invention may have an ethylene content of 30 to 80 wt %, a propylene content of 20 to 70 wt %, and a diene content of 0 to 15 wt %. A diene monomer which may be used in the present invention has two or more double bonds, and the examples thereof may include 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, 5-vinyl-2-norbornene, 2,5-norbornadiene, 7-methyl-2,5-norbornadiene, 7-ethyl-2,5-norbornadiene, 7-propyl-2,5-norbornadiene, 7-butyl-2,5-norbornadiene, 7-phenyl-2,5-norbornadiene, 7-hexyl-2,5-norbornadiene, 7,7-dimethyl-2,5-norbornadiene, 7-methyl-7-ethyl-2,5-norbornadiene, 7-chloro-2,5-norbornadiene, 7-bromo-2,5-norbornadiene, 7-fluoro-2,5-norbornadiene, 7,7-dichloro-2,5-norbornadiene, 1-methyl-2,5-norbornadiene, 1-ethyl-2,5-norbornadiene, 1-propyl-2,5-norbornadiene, 1-butyl-2,5-norbornadiene, 1-chloro-2,5-norbornadiene, 1-bromo-2,5-norbornadiene, 5-isopropyl-2-norbornene, 1,4-cyclohexadiene, bicyclo(2,2,1)hepta-2,5-diene, 5-ethylidene-2-norbornene, 5-methylene-2-norbornene, bicyclo(2,2,2)octa-2,5-diene, 4-vinylcyclohexa-1-ene, bicyclo(2,2,2)octa-2,6-diene, 1,7,7-trimethylbicyclo-(2,2,1)hepta-2,5-diene, dicyclopentadiene, methyltetrahydroindene, 5-arylbicyclo(2,2,1)hepta-2-ene, 1,5-cyclooctadiene, 1,4-diarylbenzene, butadiene, isoprene, 2,3-dimethyl-1,3-butadiene, 1,2-butadiene, 4-methyl-1,3-pentadiene, 1,3-pentadiene, 3-methyl-1,3-pentadiene, 2,4-dimethyl-1,3-pentadiene, 3-ethyl-1,3-pentadiene, and the like, and most preferably, the diene monomer may be 5-ethylidene-2-norbornene and dicyclopentadiene. The diene monomer may be selected depending on the processing characteristics of the ethylene-propylene-diene copolymer, and if necessary, two or more diene monomers may be mixed.

In this case, a preferred reactor pressure and temperature may be a pressure of 1 to 1000 atm, more preferably 5 to 100 atm, and for an effective polymerization reaction, a polymerization reaction temperature of 170 to 250° C., preferably 180 to 200° C.

The ethylene-olefin diene copolymer prepared according to an exemplary embodiment of the present invention may have an ethylene content of 30 to 80 wt %, an olefin content of 20 to 70 wt %, and a diene content of 0 to 15 wt %.

Generally, in the case of preparing the ethylene-propylene-diene copolymer, the molecular weight of the copolymer is decreased with the increased content of propylene, however, in the case of the ethylene-propylene-diene copolymer according to the present invention, a product having a relatively high molecular weight may be prepared without a decrease of the molecular weight, even with the decreased content of propylene to 50%.

Since the catalyst composition presented in the present invention is present in a homogeneous form in a polymerization reactor, it is preferred to apply the catalyst composition to a solution polymerization process which is carried out at a temperature equal to or more than a melting point of the polymer. However, as disclosed in U.S. Pat. No. 4,752,597, the catalyst composition may be used in slurry polymerization or a gas phase polymerization process in the form of a heterogeneous catalyst composition obtained by supporting the precatalyst which is the metal-ligand complex and the cocatalyst on a porous metal oxide support.

Hereinafter, the present invention will be described in detail by the following Examples, however, the scope of the present invention is not limited thereto.

Unless otherwise stated, all experiments of synthesizing ligands and catalysts were carried out using a standard Schlenk or glove box technology under a nitrogen atmosphere, and an organic solvent used in the reaction was used after refluxing the solvent under a sodium metal and benzophenone to remove moisture, and distilling the solvent immediately before use. The $^1$H NMR analysis of the synthesized ligand and the catalyst was carried out using Bruker 400 or 500 MHz at room temperature.

IR analysis was performed on 5 mg of a compound in a solid state using Bruker ATR-IR.

Cyclohexane as a polymerization solvent was used after sufficiently removing moisture, oxygen and other catalyst poisoning materials therefrom by passing cyclohexane through a 5 Å molecular sieve and a tube filled with active alumina, and bubbling cyclohexane with high purity nitrogen. The polymerized polymer was analyzed by the methods described below:

1. Melt flow index (MI) measured at 190° C. under a load of 2.16 kg using an ASTM D1238 analysis method.
2. Density measured by ASTM D792 analysis method.
3. Molecular weight and molecular weight distribution measured by gel chromatography having a mixed column of three stages.

The solvent used herein was 1,2,4-trichlorobenzene, and the measuring temperature was 120° C.

[Preparation Example 1] Synthesis of 1,3-bis(4-fluoro-2-iodophenoxy)propane (Compound A)

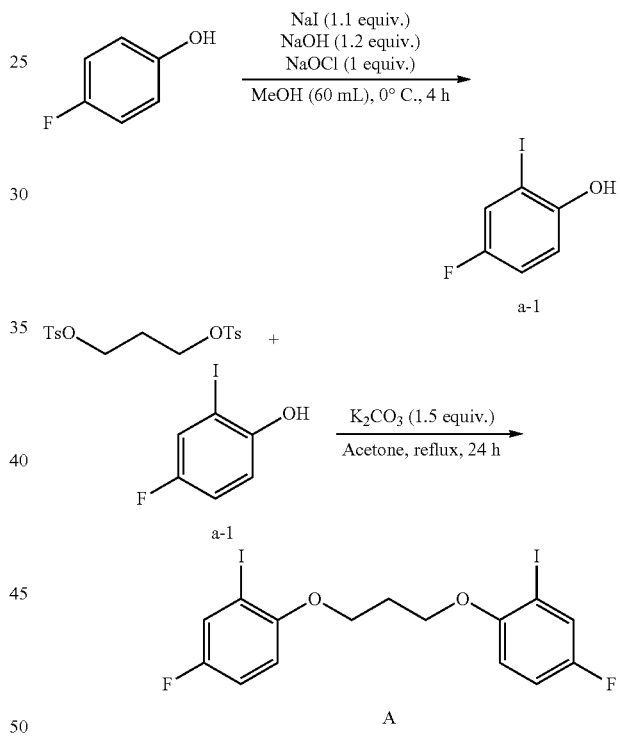

Synthesis of 4-fluoro-2-iodophenol (Compound a-1)

4-Fluorophenol (40 mmol, 4.9 g), NaI and NaOH were added in accordance with the equivalents to a round bottom flask, MeOH (60 mL) was added thereto, and the temperature was adjusted to 0° C. using ice-bath. NaOCl (1 equiv.) was added for 1 hour using a syringe pump. After adding all NaOCl, the reactants were stirred at the same temperature for 3 hours. Thereafter, 10% Sodium thiosulfate solution (30 mL) was added thereto, the pH was adjusted to 5-6 with a 5% HCl solution again, and extraction was performed with diethyl ether. The extracted filtrate was separated and purified by column chromatography (eluent EA/n-Hex=1/30 v/v) to obtain Compound a-1 in the form of a light yellow solid (5.2 g, 54%).

$^1$H NMR (CDCl$_3$): δ 7.39 (d, 1H), 7.01 (m, 1H), 6.98 (m, 1H), 5.10 (s, 1H)

Synthesis of 1,3-bis(4-fluoro-2-iodophenoxy)propane (Compound A)

Propane-1,3-diyl bis(4-methylbenzenesulfonate) (2.5 mmol, 961 mg) and Compound a-1 (5 mmol, 1.2 g) were added to a round bottom flask, K$_2$CO$_3$ (1.5 equiv.) and acetone (20 mL) were added thereto, and the reactants were heated to reflux for 24 hours. After the reaction was completed, the reactants were cooled to room temperature, acetone was removed by distillation under reduced pressure, and extraction was performed with MC (methylene chloride) and water. The extracted filtrate was separated and purified by column chromatography (eluent EA/n-Hex=1/10 v/v) to obtain Compound A as yellow solid (1.03 g, 80%).

$^1$H NMR (CDCl$_3$): δ 7.49 (d, 2H), 7.02 (m, 2H), 6.80 (m, 2H), 4.25 (t, 4H), 2.34(q, 2H)

[Example 1] Synthesis of Precatalyst WC03

Synthesis of 2-iodo-4-octylphenol (Compound 3-1)

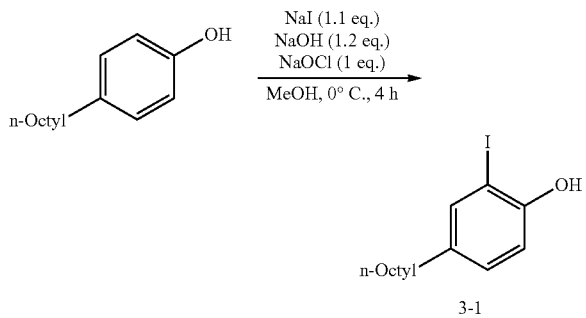

3-1

4-n-Octylphenol (20 mmol, 4.13 g), NaI (1.1 equiv.) and NaOH (1.2 equiv.) were added to a round bottom flask, MeOH (120 mL) was added thereto, and the temperature was adjusted to 0° using ice-bath. NaOCl (1 equiv.) was slowly added thereto for 1 hour using a syringe pump, and the reactants were further stirred at the same temperature for 3 hours. After adding 10% Sodium thiosulfate solution (30 mL) thereto, the pH was adjusted to 5-6 using a 5% HCl solution, and extraction was performed with diethyl ether. The solvent was removed from the extracted filtrate, and column chromatography (eluent EA/n-Hex=1/30 v/v) was used to obtain Compound 3-1 in the form of colorless liquid (2.9 g, 65%).

Synthesis of 2-(2-iodo-4-octylphenoxy)tetrahydro-2H-pyran (Compound 3-2)

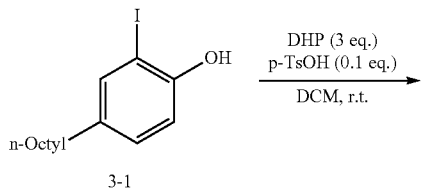

3-1

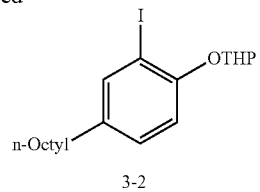

3-2

Compound 3-1 and p-TsOH (0.1 equiv.) were added to a round bottom flask, DCM (50 mL) was added, DHP (Dihydropyran, 3 equiv.) was added thereto, and then the reactants were stirred at room temperature for 30 minutes. Thereafter, extraction was performed with a 1M K$_2$CO$_3$ solution, and column chromatography (eluent EA/n-Hex=1/30 v/v) was performed to obtain Compound 3-2 in the form of colorless liquid (9.2 g, 85%).

$^1$H NMR (CDCl$_3$): δ 7.46 (s, 1H), 7.05 (d, 1H), 6.90 (d, 1H), 5.13 (s, 1H), 2.49 (t, 3H), 1.55 (m, 2H), 1.28 (m, 10H), 0.88 (t, 3H)

Synthesis of 3,6-di-tert-butyl-9-(5-octyl-2-((tetrahydro-2H-pyran-2-yl)oxy)phenyl)-9H-carbazole (Compound 3-3)

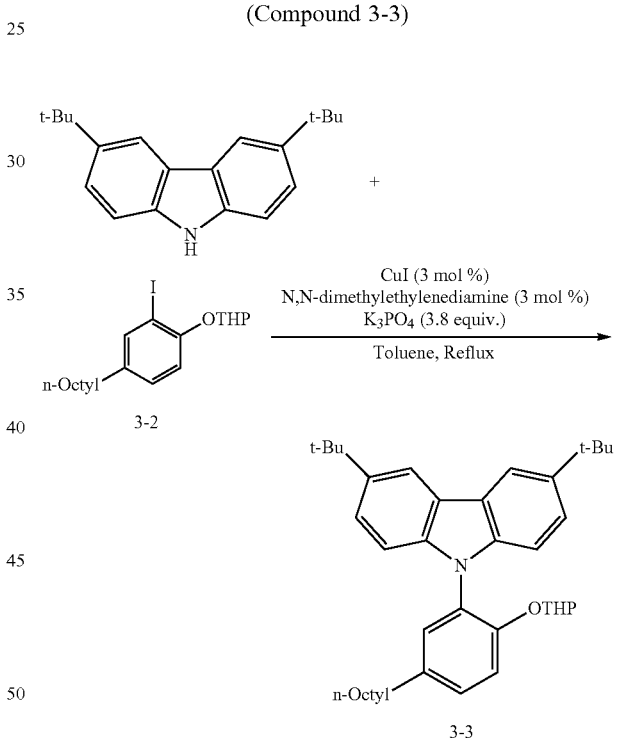

3-3

3,6-Di-tert-butyl-9H-carbazole (5 mmol, 1.4 g) and Compound 3-2 (1.8 equiv.) were added to a two-neck round bottom flask, CuI (3 mol %), N,N-Dimethylethylenediamine (3 mol %) and K$_3$PO$_4$ (3.8 equiv.) were added thereto, and a Schlenk line was used to create a nitrogen condition. Thereafter, toluene (25 mL) was added thereto, and the reactants were heated to reflux at 125° C. for 4 days. After completing the reaction, the product was cooled to room temperature, and the catalyst was removed therefrom through a silica filter. Here, THF was used as a washing solution. The solvent was removed by distillation under reduced pressure, and the product was recrystallized using acetonitrile (5 mL), thereby obtaining Compound 3-3 as a colorless solid (0.94 g, 51%).

$^1$H NMR (CDCl$_3$): δ 8.13 (s, 2H), 7.43 (m, 2H), 7.31 (m, 2H), 7.29 (m, 1H), 7.17 (m, 1H), 7.13 (m, 1H), 5.21 (m, 1H), 4.15 (m, 1H), 3.74 (m, 1H), 3.70 (m, 1H), 2.62 (m, 2H), 1.62 (m, 2H), 1.47 (s, 20H), 1.38~1.25 (m, 18H), 0.88 (m, 3H)

Synthesis of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (Compound 3-4)

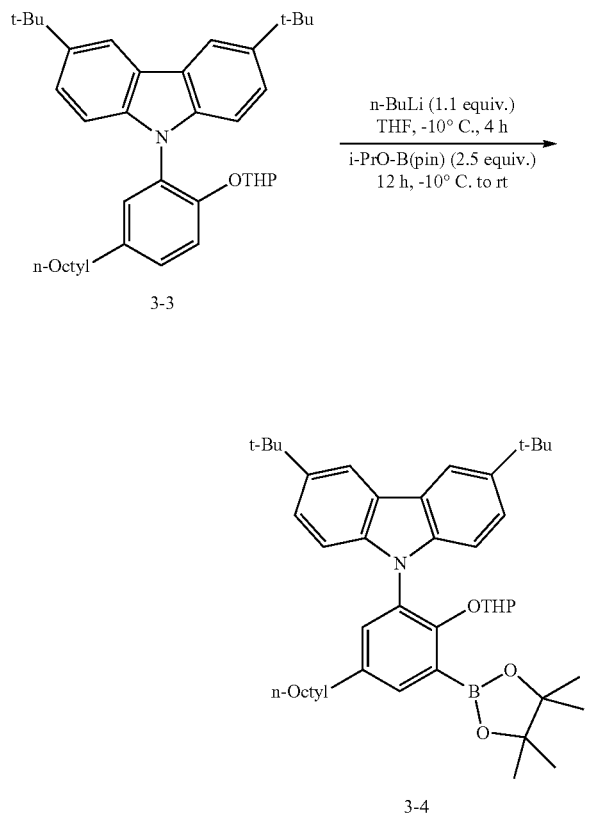

Under a nitrogen atmosphere, Compound 3-3 (4 mmol, 2.3 g) was added to a round bottom flask, THF (45 mL) was added thereto, n-BuLi (1.1 equiv.) was very slowly added thereto at −10° C., and then the reactants were stirred for 4 hours. After 4 hours, 2-isopropoxy-4,4,5,5-tetramethyl-1,3,2-dioxaborolane (i-PrO-B(pin), 2.5 equiv.) was very slowly added thereto, and then the temperature was raised to room temperature, and the reactants were stirred for 12 hours. After the reaction, a cold sat. NaHCO$_3$(aq) solution (35 mL) was added thereto, the reactants were stirred for 10 minutes, and extraction was performed using DCM. After the extraction, the produced solid was filtered through a silica gel short column with ethyl acetate, and then the solvent was evaporated to obtain a white solid, which was added to acetonitrile (10 mL), and stirred for 1 hour. After stirring, the compound obtained from filtration was dried, thereby obtaining Compound 3-4 as a colorless solid (1.1 g, 41%).

$^1$H NMR (CDCl$_3$): δ 8.13 (s, 2H), 7.94 (s, 1H), 7.55 (s, 1H), 7.45 (d, 2H), 7.35 (s, 1H), 7.17 (m, 1H), 7.13 (d, 2H), 2.58 (t, 2H), 1.61 (m, 3H), 1.44-1.37 (m, 20H), 1.35 (s, 12H), 1.27 (m, 10H), 0.87 (m, 3H)

Synthesis of Ligand WC03L

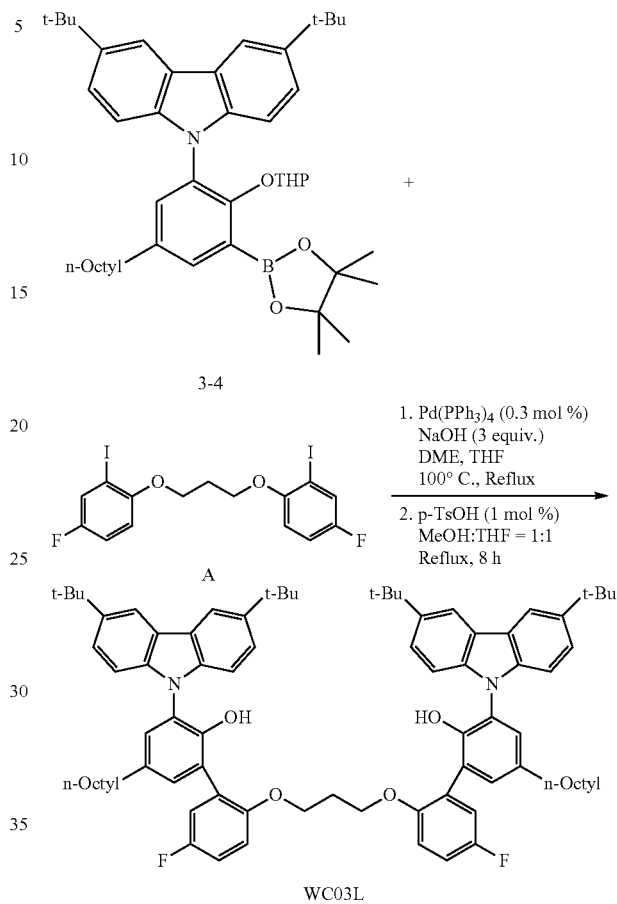

Under a nitrogen atmosphere, Compound 3-4 (2 mmol), Compound A (0.5 equiv.), Pd(PPh$_3$)$_4$ (0.3 mol %), and NaOH (3 equiv.) were added to a two-neck round bottom flask, DME (40 mL), THF (20 mL) and H$_2$O (10 mL) were added thereto in this order, and the reactants were refluxed at 100° C. for 48 hours. After completing the reaction, the product was cooled to room temperature, and the catalyst was removed therefrom through a silica filter. The solvent was removed by distillation under reduced pressure, and the remaining solvent was removed using vacuum.

The residue from which the solvent was removed was added to a round bottom flask, p-TsOH (1 mol %) was added thereto, then 100 mL each of MeOH and THF was added thereto, and the reactants were heated to reflux at 80° C. for 8 hours. After completing the reaction, the product was cooled to room temperature, and extraction was performed with water. The extracted filtrate was separated and purified by column chromatography (eluent EA/n-Hex=1/50 v/v), and then the product was recrystallized using EA (5 mL), thereby obtaining a ligand WC03L (0.7 g, 29%).

$^1$H NMR (CDCl$_3$): δ 8.22 (s, 4H), 7.43 (m, 4H), 7.36 (s, 2H), 7.32 (s, 2H), 7.12 (m, 6H), 7.03 (s, 2H), 6.54 (m, 2H), 6.05 (m, 2H), 5.47 (s, 2H), 3.83 (m, 4H), 2.59 (m, 4H), 2.08 (m, 2H), 1.35-1.27 (m, 66H), 0.90 (m, 6H); $^{13}$C-{$^1$H}-NMR: 156.2, 151.2, 148.2, 142.9, 139.9, 135.7, 131.1, 128.9, 128.0, 127.9, 126.7, 124.9, 123.6, 123.5, 118.4, 118.2, 116.4, 115.5, 115.3, 113.1, 113.0, 109.5, 65.2, 35.1, 34.8, 32.2, 32.0, 31.6, 29.5, 29.44, 29.41, 29.0, 22.8, 14.2

Synthesis of Precatalyst WC03

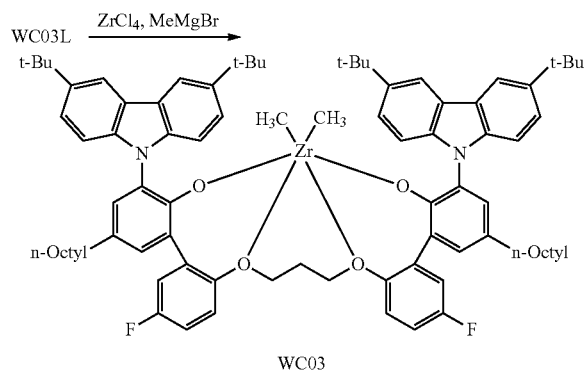

WC03

The reaction was performed in a glove box under a nitrogen atmosphere. ZrCl₄ (0.45 g, 1.93 mmol) and toluene (80 mL) were added to a 100 mL flask to prepare slurry. The slurry was cooled to −20° C. for 30 minutes in a glove box refrigerator. 3.0 M methyl magnesium bromide (2.6 mL, 10.2 mmol) in diethyl ether was added to the slurry at low temperature under stirring. The mixture was intensely stirred for 30 minutes. The solid was dissolved, but the reaction solution became a cloudy yellow color. The ligand WC03L (2.0 g, 1.6 mmol) as a solid was slowly added to the mixture. After the reaction flask was heated to room temperature, the reactants were stirred for 12 hours, and the reaction mixture was filtered through a syringe connected with a membrane filter. The filtered solution was dried under vacuum, thereby obtaining the precatalyst WC03 as a brown solid (2.04 g, yield: 93.2%).

$^1$H NMR (CDCl₃): δ 8.31 (s, 2H), 8.02 s, 2H), 7.56 (s, 2H), 7.50 (s, 2H), 7.41 (d, 2H), 7.25 (d, 2H), 7.23 (s, 2H), 6.95 (m, 2H), 6.25 (t, 2H), 4.61 (t, 2H), 3.84 (t, 2H), 3.32 (t, 2H), 2.0~1.3 (m, 34H), 1.78 (s, 2H), 1.72 (s, 18H), −1.62 (s, 6H)

[Example 2] Synthesis of Precatalyst WC04

Synthesis of 2-iodo-4-dodecylphenol (Compound 4-1)

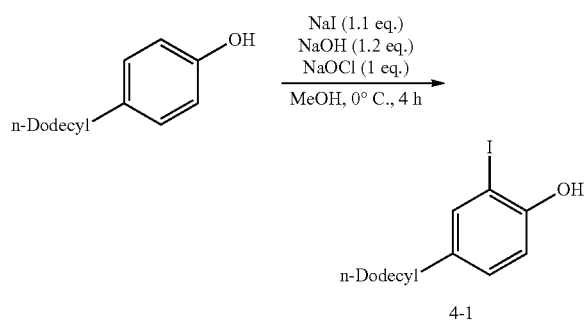

4-n-Dodecylphenol (40 mmol, 10.5 g), NaI (1.1 equiv.) and NaOH (1.2 equiv.) were added to a round bottom flask, MeOH (120 mL) was added thereto, and the temperature was adjusted to 0° C. using ice-bath. NaOCl (1 equiv.) was slowly added thereto for 1 hour using a syringe pump, and then the reactants were further stirred at the same temperature for 3 hours. Thereafter, 10% sodium thiosulfate solution (30 mL) was added thereto, the pH was adjusted to 5-6 using a 6.5% HCl solution again, and extraction was performed with diethyl ether. The extracted filtrate was separated and purified by column chromatography (eluent EA/n-Hex=1/30 v/v) to obtain Compound 4-1 in the form of colorless liquid (8 g, 65%).

Synthesis of 2-(2-iodo-4-dodecylphenoxy)tetrahydro-2H-pyran (Compound 4-2)

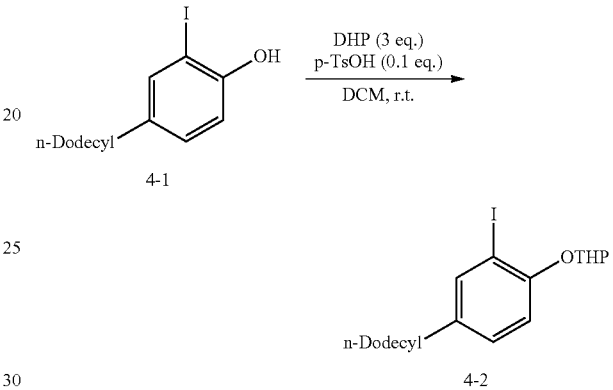

Compound 4-1 and p-TsOH (0.1 equiv.) were added to a round bottom flask, and DCM (50 mL) was added thereto. After adding DHP (3 equiv.), the reactants were stirred at room temperature for 30 minutes. When the reaction was completed, extraction was performed with a 1M K₂CO₃ solution, and the product was separated and purified with column chromatography (eluent EA/n-Hex=1/60 v/v) to obtain Compound 4-2 in the form of colorless liquid (9.4 g, 95%).

Synthesis of 3,6-di-tert-butyl-9-(5-dodecyl-2-((tetrahydro-2H-pyran-2-yl)oxy)phenyl)-9H-carbazole (Compound 4-3)

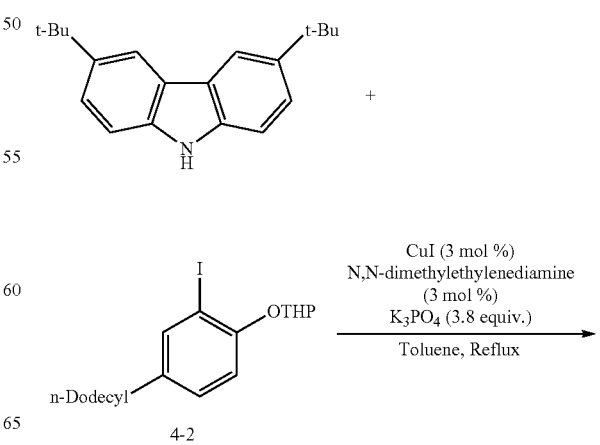

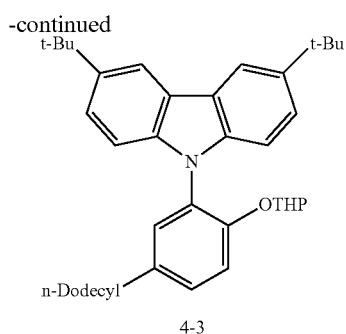

4-3

3,6-Di-tert-butyl-9H-carbazole (5 mmol, 1.4 g) and Compound 4-2 (1.8 equiv.) were added to a two-neck round bottom flask, CuI (3 mol %), N,N-dimethylethylenediamine (3 mol %) and $K_3PO_4$ (3.8 equiv.) were added thereto, and a Schlenk line was used to create a nitrogen condition. After adding toluene (25 mL) thereto, the reactants were heated to reflux at 125° C. for 4 days. After completing the reaction, the product was cooled to room temperature, and the catalyst was removed therefrom through a silica filter. Here, THF was used as a washing solution. After the solvent was removed by distillation under reduced pressure, the product was recrystallized using acetonitrile (5 mL), thereby obtaining Compound 4-3 as a colorless solid (0.94 g, 30%).

Synthesis of 3,6-di-tert-butyl-9-(5-dodecyl-2-((tetrahydro-2H-pyran-2-yl)oxy)-3-(4,4,5,5-tetramethyl-1,3,2-dioxaborolan-2-yl)phenyl)-9H-carbazole (Compound 4-4)

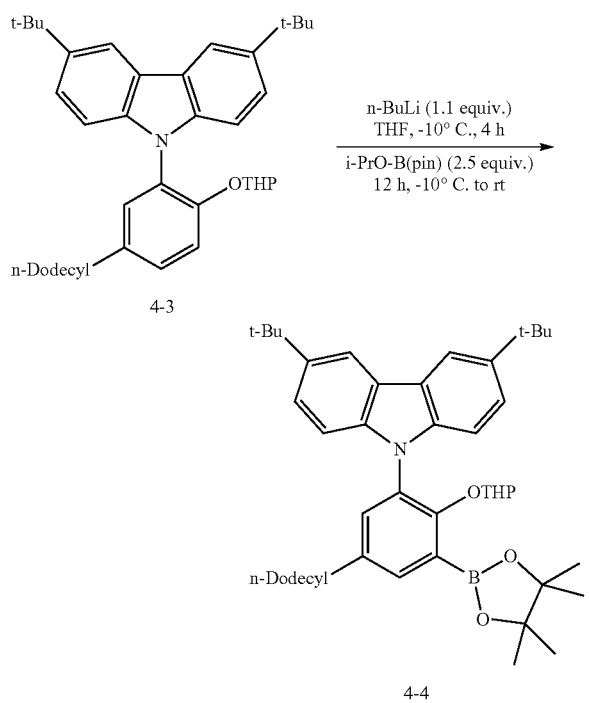

Under a nitrogen atmosphere, Compound 4-3 (4 mmol, 2.3 g) was added to a round bottom flask, THF (45 mL) was added thereto, n-BuLi (1.1 equiv.) was very slowly added thereto at −10° C., and then the reactants were stirred for 4 hours. After 4 hours, 2-iso-Propoxy-4,4,5,5-tetramethyl-1,3,2-dioxaborolane (2.5 equiv.) was very slowly added thereto, and then the temperature was raised to room temperature, and the reactants were stirred for 12 hours. After completing the reaction, a cold sat. $NaHCO_3$(aq) solution (35 mL) was added thereto, the reactants were stirred for 10 minutes, and extraction was performed using DCM. Thereafter, the product was used in the state of a crude mixture in the next reaction.

Synthesis of Ligand WC04L

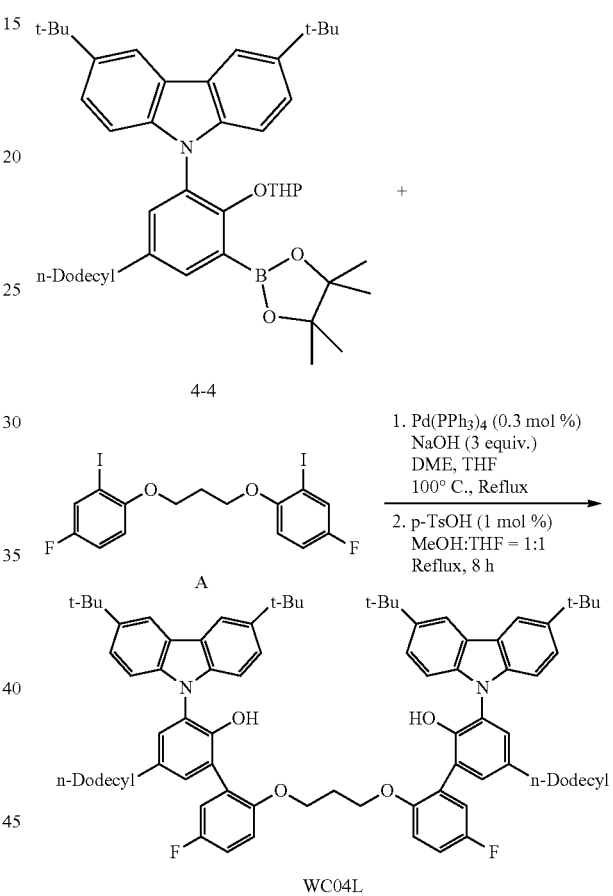

Under a nitrogen atmosphere, Compound 4-4 (2 mmol), Compound A (0.5 equiv.), $Pd(PPh_3)_4$ (0.3 mol %), and NaOH (3 equiv.) were added to a two-neck round bottom flask, DME (40 mL), THF (20 mL) and $H_2O$ (10 mL) were added thereto in this order, and the reactants were refluxed at 100° C. for 48 hours. After completing the reaction, the product was cooled to room temperature, from which the catalyst was removed through a silica filter, the solvent was removed by distillation under reduced pressure, and the remaining solvent was removed using vacuum.

The residue from which the solvent was removed was added to a round bottom flask, and p-TsOH (1 mol %) was added thereto. Again, 100 mL of each of MeOH and THF was added thereto, and then the reactants were heated to reflux at 80° C. for 8 hours. After completing the reaction, the product was cooled to room temperature, and extraction was performed with water. Thereafter, the product was separated and purified by column chromatography (eluent EA/n-Hex=1/50 v/v), and then the product was recrystallized using EA (5 mL) again, thereby obtaining a ligand WC04L (0.5 g).

$^1$H NMR (CDCl$_3$): δ 8.17 (s, 4H), 7.49~6.92 (m, 18H), 6.54 (m, 2H), 6.05 (m, 2H), 5.47 (s, 2H), 1.50~0.65 (m, 88H)

Synthesis of Precatalyst WC04

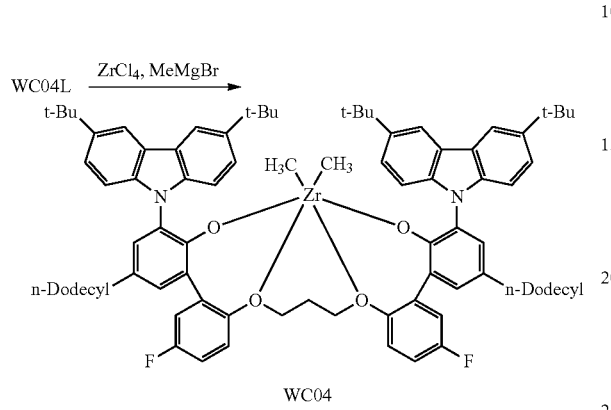

The precatalyst WC04 was prepared in the same manner as in Example 1, except using a ligand WC04L instead of the ligand WC03L.

$^1$H NMR (CDCl$_3$): δ 8.35 (s, 2H), 8.03 s, 2H), 7.54~6.95 (m, 18H), 6.54 (m, 2H), 6.05 (m, 2H), 5.47 (s, 2H), 1.50~0.65 (m, 88H), −1.63 (s, 6H)

[Comparative Example 1] Synthesis of Precatalyst WC01

Preparation of 2-iodo-4-(2,4,4-trimethylpentan-2-yl) phenol (Compound 1-1)

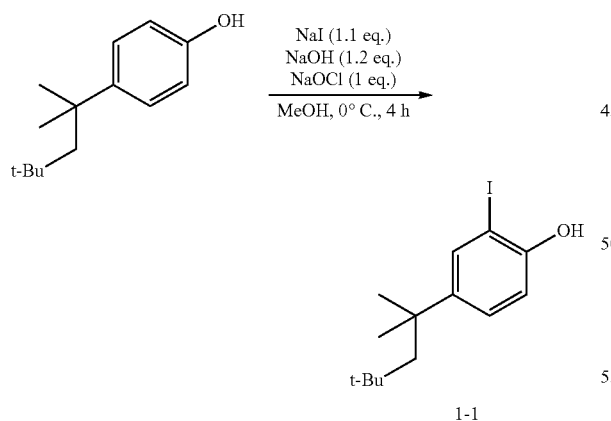

4-(2,4,4-Trimethylpentan-2-yl)phenol (50 mmol, 10.32 g), NaI (1.1 equiv.), and NaOH (1.2 equiv.) were added to a round bottom flask. MeOH (120 mL) was added thereto, the temperature was adjusted to 0° C. using ice-bath, and NaOCl (1 equiv.) was slowly added thereto for 1 hour using a syringe pump. Thereafter, the reactants were stirred at the same temperature for 3 hours, and 10% sodium thiosulfate solution (30 mL) was added thereto. The pH was adjusted to 5-6 using the 5% HCl solution again, extraction was performed with diethyl ether, and then the product was separated and purified with column chromatography (eluent: EA/n-Hex=1/30 v/v) to obtain Compound 1-1 in the form of colorless liquid (8.64 g, 52%).

Preparation of 2-(2-iodo-4-(2,4,4-trimethylpentan-2-yl)phenoxy)tetrahydro-2H-pyran (Compound 1-2)

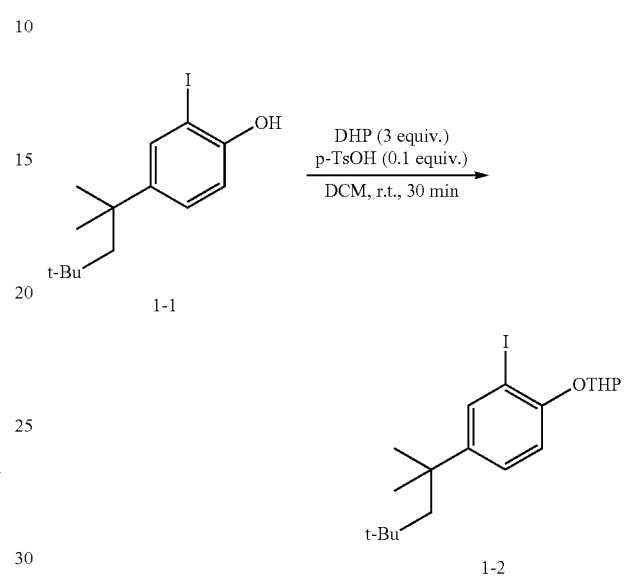

Compound 1-1 and p-TsOH (0.1 equiv.) were added to a round bottom flask, and dissolved in DCM (50 mL). After adding DHP (3 equiv.) thereto, p-TsOH (0.1 equiv.) was added, and the reactants were stirred at room temperature for 30 minutes. Thereafter, the reaction mixture was extracted with a 1M K$_2$CO$_3$ solution, and the product was separated and purified with column chromatography (eluent EA/n-Hex=1/30 v/v) to obtain Compound 1-2 in the form of colorless liquid (9.2 g, 85%).

Synthesis of 3,6-di-tert-butyl-9-(2-((tetrahydro-2H-pyran-2-yl)oxy)-5-(2,4,4-trimethylpentan-2-yl)phenyl)-9-carbazole (Compound 1-3)

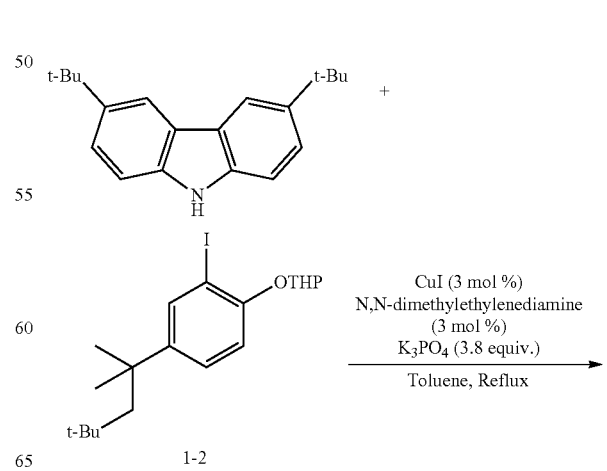

-continued

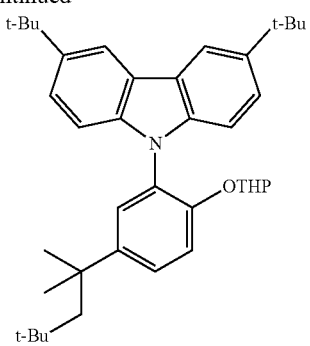

1-3

3,6-Di-tert-butyl-9H-carbazole (9.5 mmol, 2.7 g) and Compound 1-2 (1.8 equiv.) were added to a two-neck round bottom flask, CuI (3 mol %), N,N-Dimethylethylenediamine (3 mol %) and $K_3PO_4$ (3.8 equiv.) were added thereto, and a Schlenk line was used to create a nitrogen condition. After adding toluene (50 mL) thereto again, and the reactants were heated to reflux at 125° C. for 4 days. After completing the reaction, the product was cooled to room temperature, and the catalyst was removed therefrom through a silica filter. Here, THF was used as a washing solution. The solvent was removed by evaporation, the product was filtered through a silica gel short column with ethyl acetate, and recrystallized with acetonitrile (10 mL), thereby obtaining Compound 1-3 as a colorless solid (3.7 g, 80%).

$^1$H NMR (CDCl$_3$): δ 8.13 (s, 2H), 7.47 (s, 1H), 7.42 (m, 3H), 7.31 (d, 1H), 7.15 (d, 1H), 7.09 (d, 1H), 5.22 (s, 1H), 3.74 (m, 1H), 3.49 (m, 1H), 1.74 (s, 2H), 1.47 (s, 18H), 1.38 (s, 6H), 0.8 (s, 9H)

Synthesis of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (Compound 1-4)

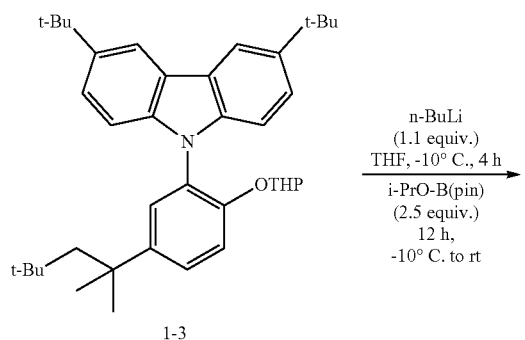

1-3

-continued

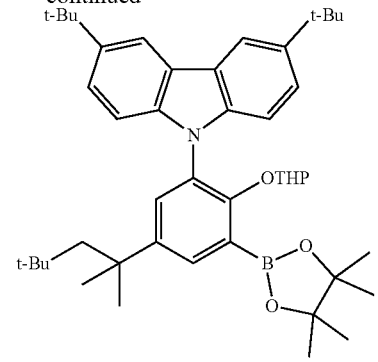

1-4

In the presence of nitrogen, Compound 1-3 (6.5 mmol, 3.6 g) was added to a round bottom flask, THF (45 mL) was added thereto, n-BuLi (1.1 equiv.) was very slowly added thereto at −10° C., and then the reactants were stirred for 4 hours. Thereafter, 2-iso-propoxy-4,4,5,5-tetramethyl-1,3,2-dioxaborolane (2.5 equiv.) was very slowly added thereto, and then the temperature was raised to room temperature, and the reactants were stirred for 12 hours. After completing the reaction, a cold sat. NaHCO$_3$(aq) solution (35 mL) was added thereto, the reactants were stirred for 10 minutes, and extraction was performed using DCM. The produced solid was filtered through a silica gel short column with ethyl acetate, and then the solvent was evaporated to obtain a white solid, which was added to acetonitrile (10 mL), and stirred for 1 hour. After stirring, the compound obtained from filtration was dried, thereby obtaining Compound 1-4 as a colorless solid (4.3 g, 83%).

$^1$H NMR (CDCl$_3$): δ 8.15 (s, 1H), 8.09 (s, 2H), 8.0 (s, 1H), 7.71~7.55 (dd, 1H), 7.45 (m, 4H), 7.14 (d, 1H), 7.10 (d, 1H), 4.84 (s, 1H), 2.74 (m, 1H), 2.60 (m, 1H), 1.65 (s, 3H), 1.60 (s, 2H), 1.55 (s, 5H), 1.45 (s, 27H), 1.38 (m, 27H), 0.81 (s, 5H), 0.77 (s, 9H)

Synthesis of 4-fluoro-2-iodo-6-methylphenol (Compound 1-5)

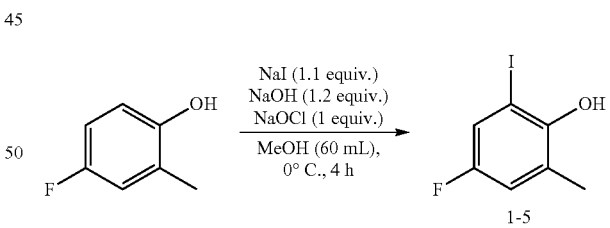

4-Fluoro-2-methylphenol (20 mmol, 2.5 g), NaI and NaOH were added in accordance with the equivalent to a round bottom flask. MeOH (60 mL) was added thereto, the temperature was adjusted to 0° C. using ice-bath, and NaOCl (1 equiv.) was slowly added thereto for 1 hour using a syringe pump. After adding all NaOCl, the reactants were stirred at the same temperature for 3 hours. Thereafter, 10% sodium thiosulfate solution (30 mL) was added thereto, the pH was adjusted to 5-6 with a 5% HCl solution again, and extraction was performed with diethyl ether. The extracted filtrate was separated and purified by column chromatography (eluent EA/n-Hex=1/30 v/v) to obtain Compound 1-5 in the form of a light yellow solid (4.3 g, 80%).

Synthesis of propane-1,3-diyl bis(4-methylbenzenesulfonate) (Compound 1-6)

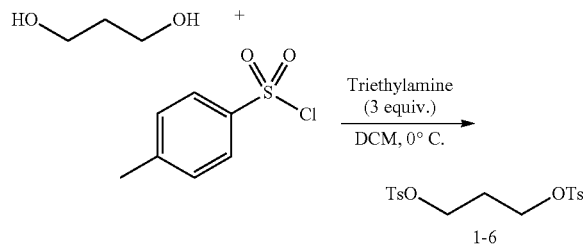

Propane-1,3-diol (25 mmol, 1.9 g), and 4-methylbenzene-1-sulfonyl chloride (55 mmol, 10.5 g) were added to a round bottom flask, and then DCM (200 mL) was added thereto, and the temperature was adjusted to 0° C. using ice-bath. After adding triethylamine (75 mmol, 7.6 g) thereto, the reactants were stirred at room temperature for 12 hours after adding triethylamine. After completing the reaction, extraction was performed using DCM, and the product was filtered through a silica gel short column with ethyl acetate, and then recrystallized using acetone, and a white solid was filtered, thereby obtaining Compound 1-6 (7.7 g, 80%).

Synthesis of 1,3-bis(4-fluoro-2-iodo-6-methylphenoxy)propane (Compound 1-7)

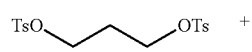

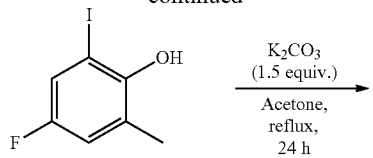

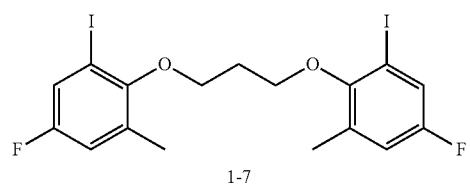

Compound 1-6 (2.5 mmol, 961 mg), and Compound 1-5 (5 mmol, 1.3 g) were added to a round bottom flask, and then K$_2$CO$_3$ (1.5 equiv.) and acetone (20 mL) were added thereto, and the reactants were heated to reflux for 24 hours. After completing the reaction, the product was cooled to room temperature, acetone was removed by distillation under reduced pressure, and extraction was performed with MC and water. The filtrate was separated and purified by column chromatography (eluent: EA/n-Hex=1/10 v/v) to obtain Compound 1-7 as a yellow solid (1.4 g, 84%).

Synthesis of Ligand WC01L

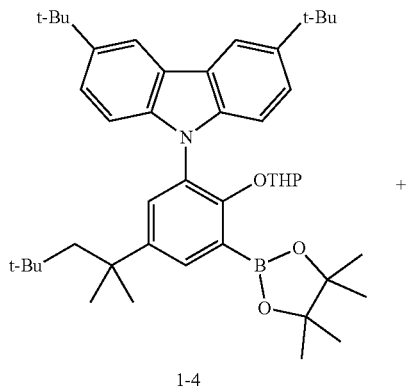

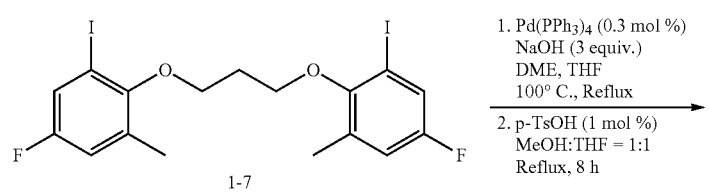

-continued

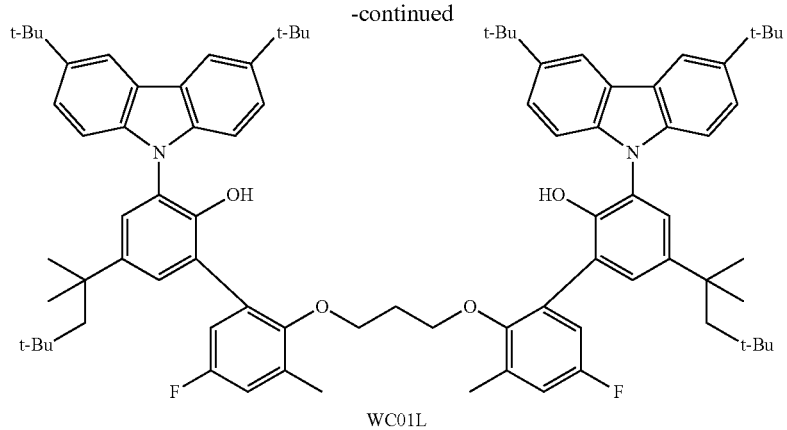

WC01L

Under a nitrogen condition, Compound 1-4 (2.5 mmol), Compound 1-7 (0.5 equiv.), Pd(PPh$_3$)$_4$ (0.3 mol %) and NaOH (3 equiv.) were added to a two-neck round bottom flask, and then DME (40 mL), THF (20 mL) and H$_2$O (10 mL) were added thereto in this order, and the reactants were heated to reflux at 100° C. for 48 hours. After completing the reaction, the product was cooled to room temperature, and the catalyst was removed therefrom through a silica filter. The filtrate was removed by distillation under reduced pressure, and the remaining solvent was removed using vacuum.

The residue from which the solvent was removed was added to a round bottom flask, and p-TsOH (1 mol %) was added thereto. Again, 100 mL of each of MeOH and THF was added thereto, and then the reactants were heated to reflux at 80° C. for 8 hours. After completing the reaction, the product was cooled to room temperature, and extraction was performed with water. Thereafter, the extracted filtrate was separated and purified by column chromatography (eluent EA/n-Hex=1/50 v/v), and then recrystallized using EA (5 mL), thereby obtaining a ligand WC01L (0.88 g, 68%).

$^1$H NMR (CDCl$_3$): δ 8.14 (s, 1H), 7.43 (s, 2H), 7.37 (m, 6H), 7.02 (d, 4H), 6.95 (dd, 2H), 6.85 (dd, 2H), 6.47 (s, 2H), 3.64 (t, 4H), 2.03 (s, 6H), 1.73 (s, 6H), 1.55 (s, 18H), 1.43 (s, 36H), 1.34 (s, 12H), 0.76 (s, 18H); $^{13}$C-{$^1$H}-NMR: 159.97, 158.03, 149.88, 147.55, 143.17, 142.57, 139.69, 128.69, 127.49, 126.45, 125.58, 123.53, 123.32, 117.15, 116.38, 116.22, 109.20, 70.9, 57.06, 38.24, 34.72, 32.44, 32.05, 31.86, 31.63, 30.61, 16.45

Synthesis of Precatalyst WC01

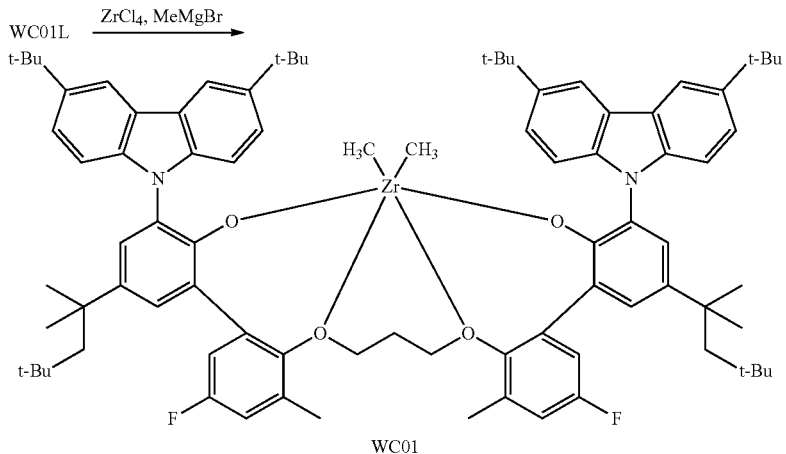

WC01

The precatalyst WC01 was prepared in the same manner as in Example 1, except using a ligand WC01L instead of the ligand WC03L.

$^1$H NMR (CDCl$_3$): δ 8.31 (s, 2H), 8.02 s, 2H), 7.56 (s, 2H), 7.50 (s, 2H), 7.41 (d, 2H), 7.25 (d, 2H), 7.23 (s, 2H), 6.95 (m, 2H), 6.25 (t, 2H), 4.61 (t, 2H), 3.76 (t, 2H), 3.38 (t, 2H), 2.35 (s, 12H), 1.85 (s, 4H), 1.83 (s, 36H), 1.52 (s, 18H), 1.45 (s, 3H), 0.98 (s, 12H), −1.65 (s, 3H)

[Comparative Example 2] Synthesis of Precatalyst WC02

Synthesis of ligand WC02L

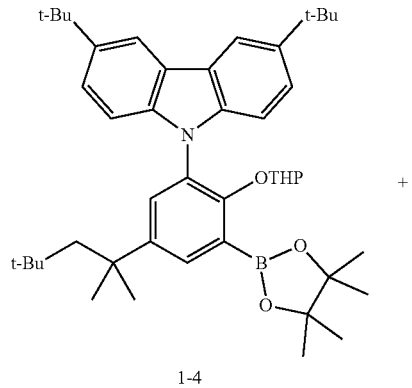

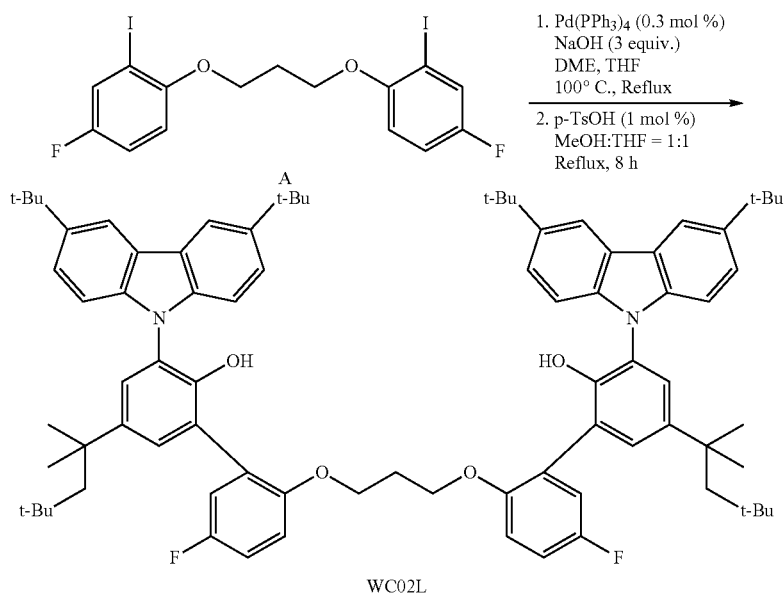

Under a nitrogen atmosphere, Compound 1-4 (2.5 mmol), Compound A (0.5 equiv.), Pd(PPh$_3$)$_4$ (0.3 mol %) and NaOH (3 equiv.) were added to a two-neck round bottom flask, DME (40 mL), THF (20 mL) and H$_2$O (10 mL) were added thereto in this order, and the reactants were heated to reflux at 100° C. for 48 hours. After completing the reaction, the product was cooled to room temperature, the catalyst was removed through a silica filter therefrom, the product was distilled under reduced pressure to remove the solvent, and the remaining solvent was removed using vacuum.

The residue from which the solvent was removed was added to a round bottom flask, p-TsOH (1 mol %) was added thereto, then 100 mL each of MeOH and THF was added thereto, and the reactants were heated to reflux at 80° C. for 8 hours. After completing the reaction, the product was cooled to room temperature, extraction was performed with water, and the product was separated and purified by column chromatography (eluent EA/n-Hex=1/50 v/v), and then recrystallized using EA (5 mL), thereby obtaining a ligand WC02L (1.1 g, 70%).

$^1$H NMR (CDCl$_3$): δ 8.23 (s, 4H), 7.45 (d, 4H), 7.43 (s, 2H), 7.39 (d, 2H), 7.25 (d, 4H), 6.95 (d, 2H), 6.53 (m, 2H), 5.95 (m, 2H), 5.40 (s, 2H), 3.80 (t, 4H), 1.99 (m, 2H), 1.71 (s, 4H), 1.49 (s, 36H), 1.36 (s, 12H), 0.80 (s, 18H); $^{13}$C-{$^1$H}-NMR: 158.0, 156.1, 151.2, 147.8, 139.9, 129.1, 128.1, 128.0, 127.2, 126.0, 124.2, 123.6, 123.3, 118.2, 118.0, 116.3, 115.3, 115.2, 112.8, 112.8, 109.2, 64.9, 57.1, 38.2, 34.7, 32.4, 32.1, 31.8, 31.5, 29.0

Synthesis of Precatalyst WC02
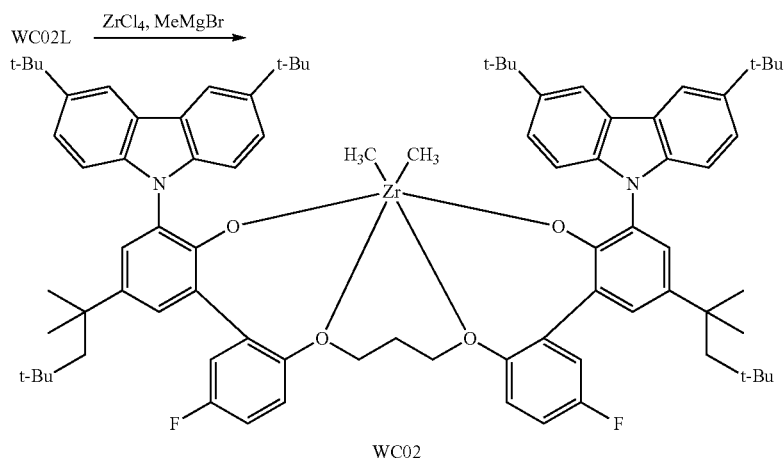
The precatalyst WC02 was prepared in the same manner as in Example 1, except using a ligand WC02L instead of the ligand WC03L.
$^1$H NMR (CDCl$_3$): δ 8.31 (s, 2H), 8.02 s, 2H), 7.56 (s, 2H), 7.50 (s, 2H), 7.41 (d, 2H), 7.25 (d, 2H), 7.23 (s, 2H), 6.95 (m, 2H), 6.25 (t, 2H), 4.61 (t, 2H), 3.76 (t, 2H), 3.38 (t, 2H), 2.35 (s, 4H), 1.85 (s, 4H), 1.83 (s, 36H), 1.52 (s, 18H), 1.45 (s, 3H), 0.98 (s, 12H), −1.65 (s, 3H)
[Comparative Example 3] Synthesis of Precatalyst WB02
Synthesis of ligand WB02L
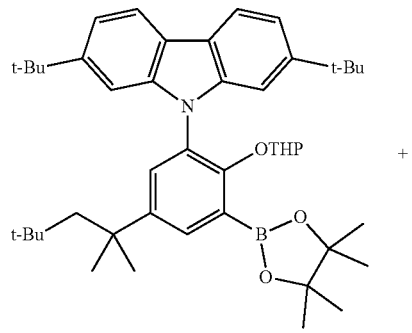
+
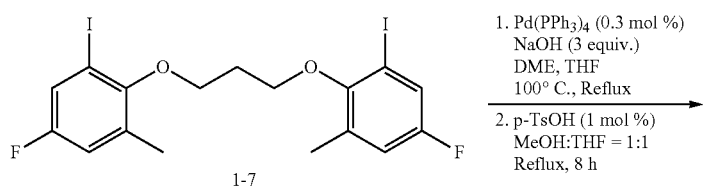
1. Pd(PPh$_3$)$_4$ (0.3 mol %)
   NaOH (3 equiv.)
   DME, THF
   100° C., Reflux
2. p-TsOH (1 mol %)
   MeOH:THF = 1:1
   Reflux, 8 h

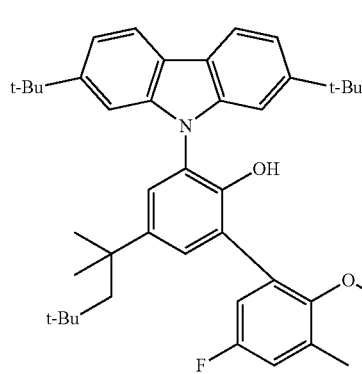
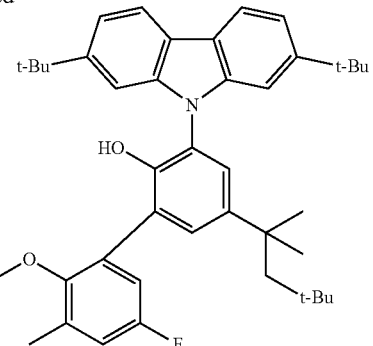

WB02L (1) Suzuki Coupling 2,7-Di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (2.5 mmol), Compound 1-7 (0.5 equiv.), Pd(PPh$_3$)$_4$ (0.3 mol %) and NaOH (3 equiv.) were added to a two-neck round bottom flask, and a nitrogen condition was created. DME (40 mL), THF (20 mL) and H$_2$O (10 mL) were added thereto in this order, and the reactants were heated to reflux at 100° C. for 48 hours. After completing the reaction, the product was cooled to room temperature, the catalyst was removed through a silica filter therefrom, the product was distilled under reduced pressure to remove the solvent, and the remaining solvent was removed using vacuum.

(2) THP Protection

To the residue obtained by removing the solvent, p-TsOH (1 mol %) was added, and 100 mL each of MeOH and THF was added thereto, and the reactants were heated to reflux at 80° C. for 8 hours. After completing the reaction, the product was cooled to room temperature, extraction was performed with water to remove the solvent, and then the product was separated and purified by column chromatography (eluent: EA/n-Hex=1/50 v/v), thereby obtaining a ligand WB02L as a colorless solid (2.2 g, 70%).

$^1$H NMR (CDCl$_3$): δ 8.02 (d, 4H), 7.41 (d, 4H), 7.31 (s, 4H), 7.26 (s, 4H), 7.06 (d, 2H), 6.85 (d, 2H), 6.21 (s, 2H), 3.61 (t, 4H), 2.05 (s, 6H), 1.92 (m, 6H), 1.42 (s, 12H), 1.27 (s, 38H), 0.79 (s, 18H); $^{13}$C-{$^1$H}-NMR: 159.8, 157.8, 150.14, 150.12, 149.7, 149.1, 147.8, 142.8, 141.7, 129.1, 127.5, 126.3, 124.9, 121.0, 119.6, 119.5, 118.2, 117.7, 117.3, 117.1, 106.3, 106.2, 70.87, 57.1, 38.2, 35.2, 35.0, 32.5, 32.4, 31.9, 31.8, 31.7, 31.6, 30.7, 29.7, 16.4

Synthesis of Precatalyst WB02

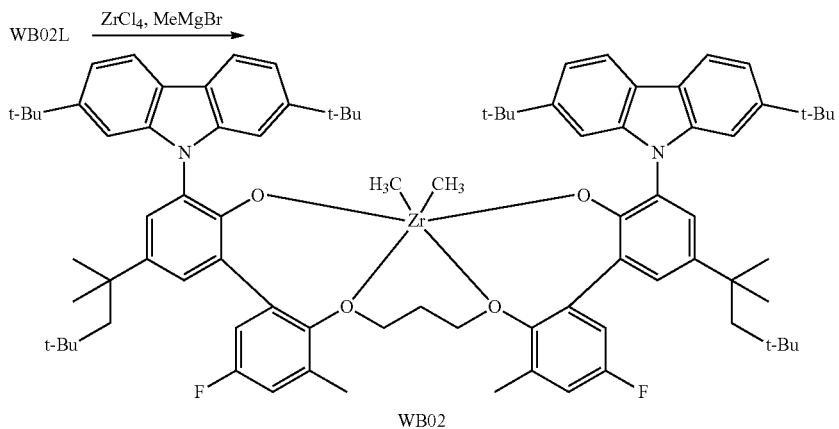

WB02

The precatalyst WB02 was prepared in the same manner as in Example 1, except using a ligand WC02L instead of the ligand WC03L.

$^1$H NMR (C$_6$D$_6$): δ 8.25 (s, 2H), 8.03 s, 2H), 7.96 (s, 2H), 7.85 (s, 2H), 7.64 (s, 2H), 7.51 (d, 2H), 7.36 (d, 2H), 7.31 (s, 2H), 6.87 (m, 2H), 6.05 (m, 2H), 3.58 (t, 2H), 3.23 (t, 2H), 1.78 (s, 2H), 1.58 (s, 18H), 1.33 (s, 18H), 1.25 (s, 3H), 1.01 (s, 3H), 0.85 (s, 12H)

[Comparative Example 4] Synthesis of Precatalyst WD01
Synthesis of ligand WD01L
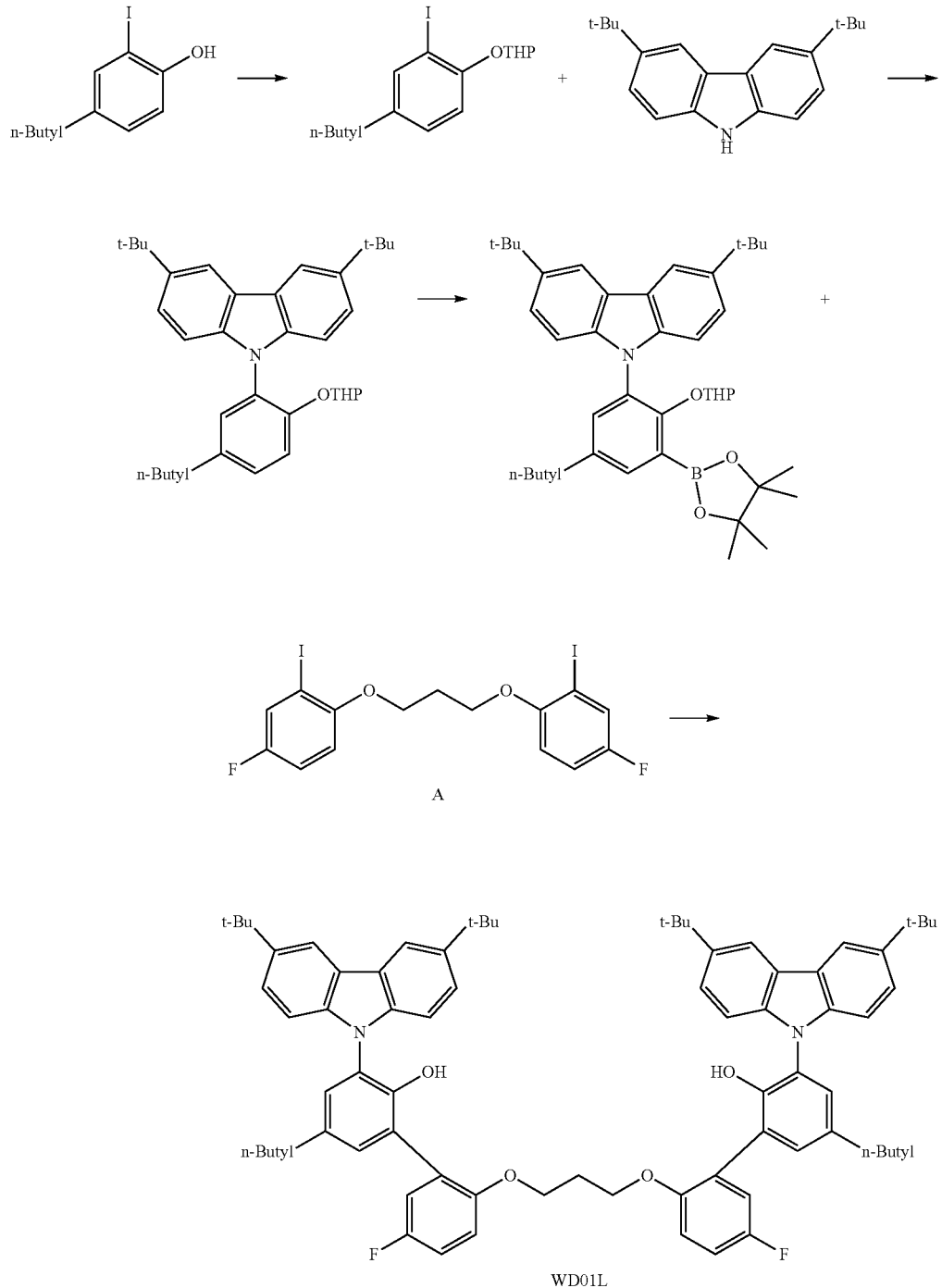
The ligand WD01L was prepared in the same manner as in Example 1, except using 2-iodo-4-n-butylphenol instead of 2-iodo-4-octylphenol (Compound 3-1).
$^1$H NMR (CDCl$_3$): δ 8.20 (s, 4H), 7.41 (d, 4H), 7.26 (s, 2H), 7.06 (d, 6H), 7.04 (d, 2H), 6.52 (m, 2H), 5.95 (m, 2H), 5.98 (m, 2H), 3.81 (t, 4H), 2.57 (t, 4H), 2.03 (d, 2H), 1.58 (m, 4H), 1.46 (s, 36H), 1.36 (m, 4H), 0.91 (m, 6H); $^{13}$C-{$^1$H}-NMR: 158.16, 156.25, 151.24, 151.22, 148.19, 142.94, 139.93, 135.73, 131.15, 128.93, 127.99, 126.69, 124.9, 123.67, 123.52, 118.4, 118.21, 116.43, 115.52, 115.35, 113.06, 113.0, 109.51, 65.21, 34.89, 34.82, 33.79, 32.2, 28.89, 22.5, 14.01

Synthesis of Precatalyst WD01
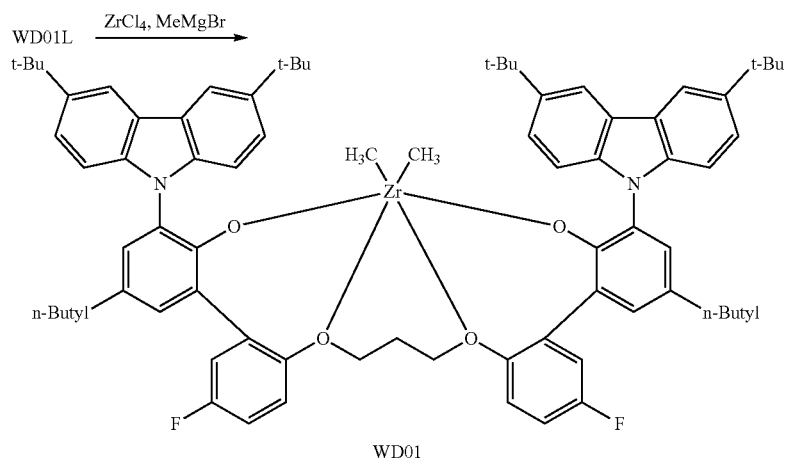
The precatalyst WD01 was prepared in the same manner as in Example 1, except using a ligand WC01L instead of the ligand WC03L.
$^1$H NMR (CDCl$_3$): δ 8.15 (s, 2H), 8.02 s, 2H), 7.56 (s, 2H), 7.50 (s, 2H), 7.23 (d, 2H), 7.21 (d, 2H), 7.19 (s, 2H), 6.95 (m, 2H), 6.21 (t, 2H), 4.61 (t, 2H), 3.84 (t, 2H), 3.32 (t, 2H), 2.0~1.3 (m, 42H), 1.36 (s, 4H), 0.92 (m, 6H), −1.62 (s, 6H)
[Comparative Example 5] Synthesis of Precatalyst WD02
Synthesis of ligand WD02L
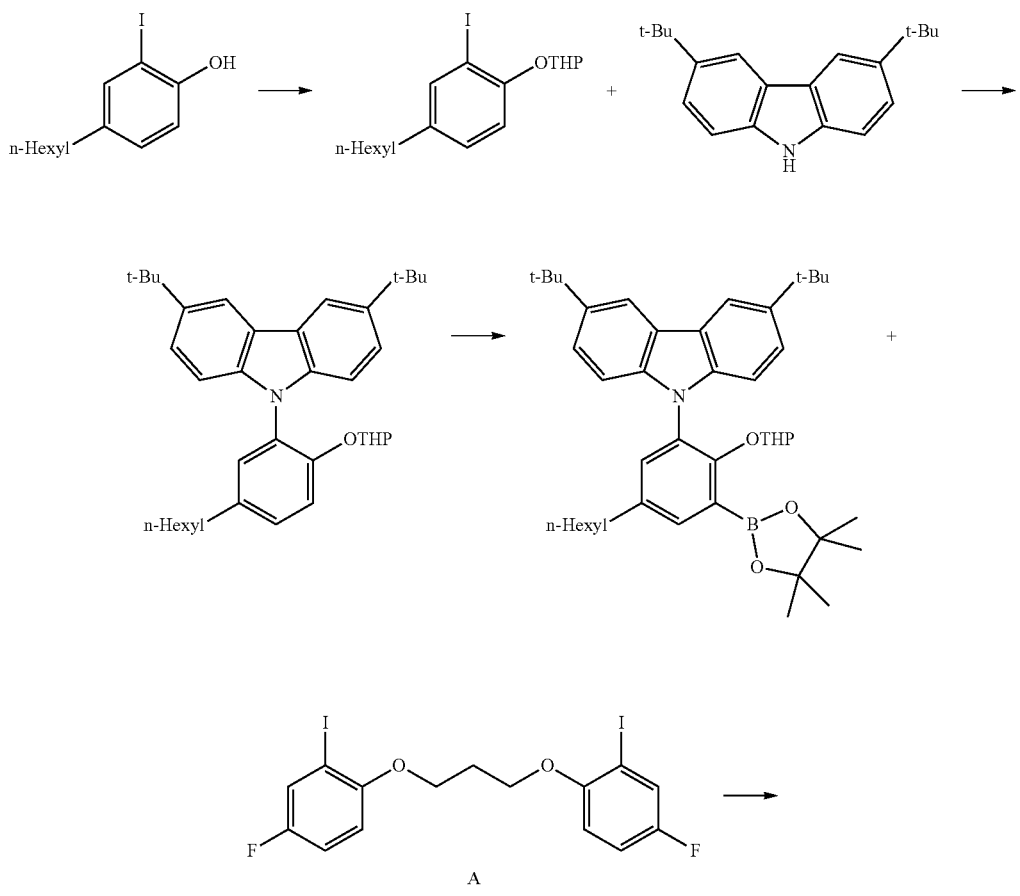

-continued

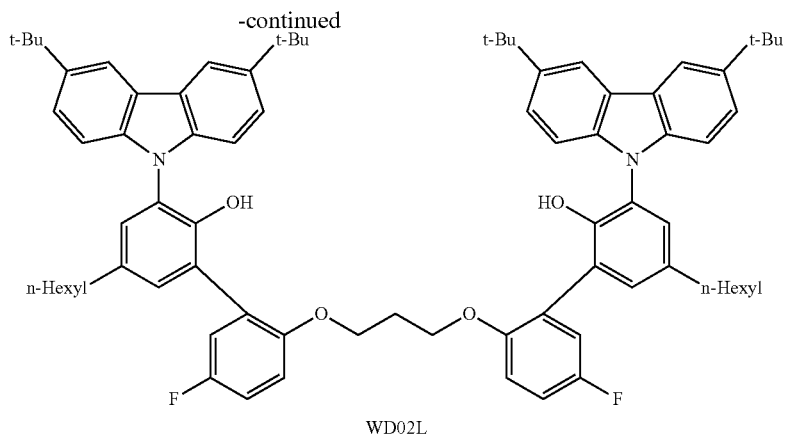

WD02L

The ligand WD02L was prepared in the same manner as in Example 1, except using 2-iodo-4-n-hexylphenol instead of 2-iodo-4-octylphenol (Compound 3-1).

$^1$H NMR (CDCl$_3$): δ 8.20 (s, 4H), 7.43 (d, 4H), 7.28 (s, 2H), 7.08 (d, 6H), 7.04 (d, 2H), 6.52 (m, 2H), 6.02 (m, 2H), 5.45 (s, 2H), 3.84 (t, 4H), 2.59 (t, 4H), 2.04 (d, 2H), 1.62 (m, 4H), 1.49 (s, 36H), 1.31 (m, 12H), 0.90 (m, 6H); $^{13}$C-{$^1$H}-NMR: 158.16, 156.25, 151.24, 148.21, 142.94, 139.93, 135.78, 131.14, 128.94, 126.70, 124.89, 123.67, 123.53, 118.39, 118.21, 116.43, 115.53, 115.35, 113.07, 113.0, 109.52, 65.21, 35.14, 34.89, 32.2, 31.79, 31.59, 29.11, 29.00, 22.73, 14.21

Synthesis of Precatalyst WDO2

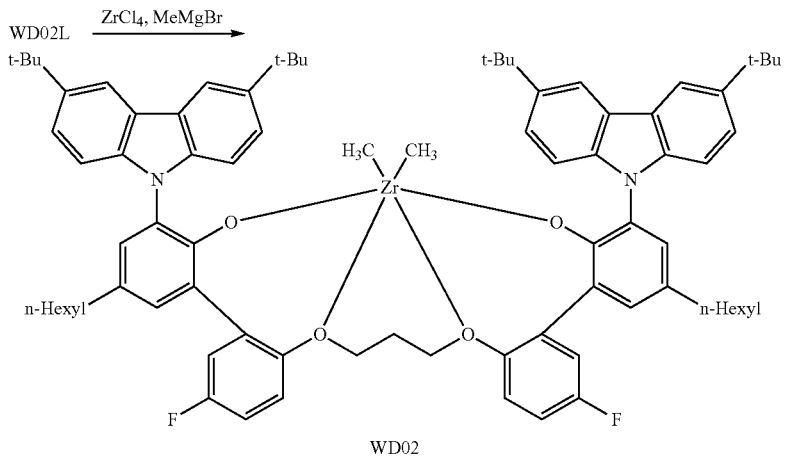

WD02

The precatalyst WD02 was prepared in the same manner as in Example 1, except using a ligand WC02L instead of the ligand WC03L.

$^1$H NMR (CDCl$_3$): δ 8.15 (s, 2H), 8.00 s, 2H), 7.32 (s, 2H), 7.21 (s, 2H), 7.07 (d, 2H), 7.04 (d, 2H), 7.00 (s, 2H), 6.95 (s, 2H), 6.51 (m, 2H), 6.21 (t, 2H), 4.61 (t, 2H), 3.84 (t, 2H), 3.32 (t, 2H), 1.61 (m, 4H), 1.5~1.3 (m, 48H), 0.92 (m, 6H), −1.62 (s, 6H)

[Example 3] Copolymerization of Ethylene and 1-Octene

Polymerization was performed in a temperature controllable, continuous polymerization reactor equipped with a mechanical stirrer. To a 1.0 L continuous stirring reactor preheated to a temperature of 130-200° C., a methyl cyclohexane solvent, 1-octene and an ethylene monomer were supplied with a pressure of 40 bar. A copolymerization reaction was carried out by supplying WC03 (Example 1) as the polymerization catalyst and TTB (Trityl Tetrakis-pentafluorophenyl Borate) as the cocatalyst from a catalyst storage tank, and TiBAO (Tetraisobutyl aluminoxane) as a scavenger to a reactor. Methyl cyclohexane as a reaction solvent was injected to the reactor in an amount of 5 kg per hour, with a reactor residence time of about 8 minutes, and ethylene was injected to the reactor with a C2/MCH ratio set to 10, in an amount range of about 400-600 g per hour. The polymerization was carried out at a relatively high temperature of 180° C., 190° C. and 200° C., the catalyst was introduced to the reactor, while adjusting an introduced catalyst amount to an amount of maintaining a temperature difference between a feed temperature and a reactor temperature, and a polymer solution formed by the copolymerization reaction was pressure-reduced to 3 bar in the rear of the reactor, and then transported to a solvent separator, thereby removing most of the solvent by the solvent separation process.

The polymerization reaction conditions and the polymerization results carried out as described above are summarized in the following Table 1.

Example 4

A process was carried out in the same manner as in Example 3, except using the precatalyst WC04 synthesized in Example 2 for polymerization. A maximum temperature of 158° C. was reached for a reaction time of 3 minutes, thereby obtaining 77 g of a high molecular polymer, and the polymerization reaction conditions and the polymerization results are shown in the following Table 1.

Comparative Example 6

A process was carried out in the same manner as in Example 3, except using WB02 synthesized in Comparative Example 3 as the precatalyst. The polymerization reaction conditions and the results are shown in the following Table 2.

Comparative Example 7

A process was carried out in the same manner as in Example 3, except using WC01 synthesized in Comparative Example 1 as the precatalyst. The polymerization reaction conditions and the results are shown in the following Table 2.

Comparative Example 8 a. A process was carried out in the same manner as in Example 3, except using WC02 synthesized in Comparative Example 2 as the precatalyst. The polymerization reaction conditions and the results are shown in the following Table 2.

Comparative Example 9

A process was carried out in the same manner as in Example 3, except using WD01 synthesized in Comparative Example 4 as the precatalyst. The polymerization reaction conditions and the results are shown in the following Table 2.

Comparative Example 10

A process was carried out in the same manner as in Example 3, except using WD02 synthesized in Comparative Example 5 as the precatalyst. The polymerization reaction conditions and the results are shown in the following Table 2.

TABLE 1

| | Example 3 | | | | Example 4 | |
|---|---|---|---|---|---|---|
| Catalyst | | | | | | |
| | WC03 (Example 1) | | | | WC04 (Example 2) | |
| Polymerization Temp. (° C.) | 190 | 200 | 180 | 190 | 180 | 190 |
| Feed Temperature (° C.) | 85 | 95 | 85 | 95 | 85 | 95 |
| delta T | 105 | 105 | 95 | 95 | 95 | 95 |
| TSR (kg/h) | 3.2 | 3.2 | 3.2 | 3.2 | 3.2 | 3.2 |
| Hold-up time (min) | 8.4 | 8.4 | 8.4 | 8.4 | 8.4 | 8.4 |
| C2 (%) | 10 | 10 | 10 | 10 | 10 | 10 |
| C8/C2 ratio | 1.0 | 1.0 | 1.0 | 1.0 | 1.0 | 1.0 |
| TTB (μmol/kg) | 50 | 50 | 50 | 50 | 50 | 50 |
| TiBAO (μmol/kg) | 200 | 200 | 200 | 200 | 200 | 200 |
| Cat Consumed (μmol/kg) | 1.6 | 1.7 | 0.9 | 1.2 | 0.9 | 1.3 |
| MI | 0.515 | 1.017 | 0.29 | 0.715 | 0.31 | 0.73 |
| Density | 0.891 | 0.8895 | 0.893 | 0.881 | 0.891 | 0.880 |
| Mw (×10³) | — | — | 131 | 122 | 135 | 121 |
| PDI | — | — | 2.4 | 2.3 | 2.3 | 2.4 |

TABLE 2

| | Comparative Example 6 | Comparative Example 7 | Comparative Example 8 | | Comparative Example 9 | | Comparative Example 10 | |
|---|---|---|---|---|---|---|---|---|
| Catalyst | | | | | | | | |
| | WB02 (Comparative Example 3) | WC01 (Comparative Example 1) | WC02 (Comparative Example 2) | | WD01 (Comparative Example 4) | | WD02 (Comparative Example 5) | |
| Polymerization Temp. (° C.) | 190 | 180 | 180 | 190 | 190 | 200 | 190 | 200 |
| Feed Temperature (° C.) | 85 | 85 | 85 | 95 | 85 | 95 | 85 | 85 |
| delta T | 95 | 95 | 95 | 95 | 105 | 105 | 105 | 105 |
| TSR (kg/h) | 3.2 | 3.2 | 3.2 | 3.2 | 3.2 | 3.2 | 3.2 | 3.2 |
| Hold-up time (min) | 8.4 | 8.4 | 8.4 | 8.4 | 8.4 | 8.4 | 8.4 | 8.4 |
| C2 (%) | 10 | 10 | 10 | 10 | 10 | 10 | 10 | 10 |
| C8/C2 ratio | 1.0 | 1.0 | 1.0 | 1.0 | 1.0 | 1.0 | 1.0 | 1.0 |
| TTB (μmol/kg) | 50 | 50 | 50 | 50 | 50 | 50 | 50 | 50 |
| TiBAO (μmol/kg) | 200 | 200 | 200 | 200 | 200 | 200 | 200 | 200 |

TABLE 2-continued

|  | Comparative Example 6 | Comparative Example 7 | Comparative Example 8 | Comparative Example 9 | Comparative Example 10 |
|---|---|---|---|---|---|
| Catalyst | WB02 (Comparative Example 3) | WC01 (Comparative Example 1) | WC02 (Comparative Example 2) | WD01 (Comparative Example 4) | WD02 (Comparative Example 5) |
| Cat Consumed (μmol/kg) | 1.4 | 6.8 | 1.6        3.4 | 1.5        2.2 | 2.0        2.3 |
| MI | 6.969 | 32.2 | 0.694    1.128 | 0.44      0.736 | 0.457    1.025 |
| Density | 0.9255 | 0.908 | 0.892    0.882 | 0.901    0.901 | 0.8977    0.9 |
| Mw (×10³) | 69 | 37 | 95        67 | —          — | —          — |
| PDI | 2.3 | 2.7 | 2.3        2.3 | —          — | —          — |

As described in the polymerization results in Tables 1 and 2, it was found that the precatalysts of the present invention (WC03 and WC04) in which a substituent having the controlled number of carbons and a certain shape is introduced to R₃ in Chemical Formula 1 are surprisingly excellent in catalytic activity and reactivity with a comonomer, as compared with the conventional catalysts, WB02, WC01, WC02, WD01 and WD02 which are the Comparative Examples. In particular, it was found that even in the high temperature polymerization at 180° C. or more, the precatalysts of the Examples of the present invention may produce the copolymer of ethylene and 1-octene having a high molecular weight as compared with the precatalyst of the Comparative Examples.

That is, in the case of WC01 and WC02, the molecular weight of the copolymers prepared by copolymerization of ethylene and 1-octene at 180° C. was 37,000 g/mole and 95,000 g/mole, respectively, while the molecular weight of the copolymers produced in the polymerization using WC03 and WC04 of the present invention as the precatalyst was 131,000 g/mole and 135,000 g/mole, respectively, and thus, a copolymer having a significantly higher molecular weight may be obtained, as compared with the Comparative Examples.

In addition, also in the polymerization at 190° C. which is higher than 180° C., the catalysts of the Comparative Examples, WB02 and WC02 produced copolymers having a molecular weight of 69,000 g/mole and 67,000 g/mole, respectively, while the copolymers produced using the precatalysts of the present invention (WC03 and WC04) had a high molecular weight of 100,000 g/mole or more.

In addition, under the same polymerization condition, when comparing the polymerization results using WD01 (Comparative Example 9) and WD02 (Comparative Example 10) in which the number of carbons at a R₃ position is less than 8 as the precatalyst, with the polymerization results using WC03 (Example 3) in which straight chain n-octyl having 8 carbon atoms is substituted at a R₃ position as the precatalyst, WC03 of the present invention had higher catalytic activity and comonomer reactivity at 200° C. which is a high polymerization temperature, thereby showing excellent characteristics in the manufacture of the product having low density. That is, for the catalyst consumption representing catalytic activity, WD01 and WD02 showed values of 2.2 and 2.3 at 200° C., while WC03 of the present invention showed a value of 1.7, which is a relatively lower catalyst consumption, and thus representing excellent catalytic activity. In addition, it was found that the polymer obtained at a polymerization temperature of 200° C. using WD01 and WD02 as the precatalyst had a density of 0.901 g/cm³ and 0.900 g/cm³, respectively, while the polymer obtained under the same polymerization condition using WD03 of the present invention as the precatalyst had a lower density of 0.8895 g/cm³.

As shown in the Examples and the Comparative Examples above, when the metal-ligand complex which is the compound having a certain functional group introduced to a certain position is used as the precatalyst, surprisingly excellent activity is shown even at high temperature. Furthermore, when the metal-ligand complex of the present invention is used as the precatalyst, reactivity with olefins is excellent, and also a polymer having a high molecular weight and low density may be easily prepared, as compared with the metal-ligand precatalyst of the Comparative Example.

As described above, though the Examples of the present invention has been described in detail, a person skilled in the art may make various variations of the present invention without departing from the scope of the present invention, as defined in the claims which follow. Accordingly, any modification of the Examples of the present invention in the future may not depart from the technique of the present invention.

The invention claimed is:

1. A metal-ligand complex represented by the following Chemical Formula 1:

[Chemical Formula 1]

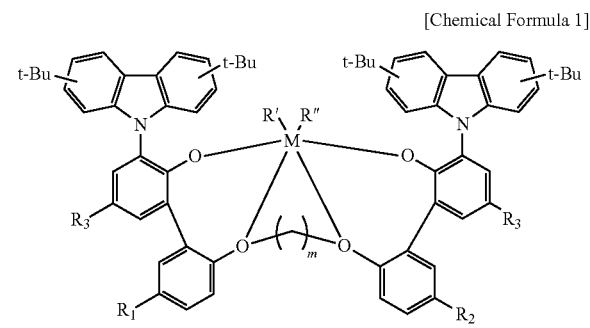

wherein

M is a Group 4 transition metal in the periodic table;

R' and R" are independently of each other (C1-C20) alkyl;

R₁ and R₂ are independently of each other halogen, (C1-C20) alkyl, (C1-C20) alkoxy or halo(C1-C20) alkyl;

R₃ is a straight chain (C8-C20) alkyl; and m is an integer of 2 to 4.

2. The metal-ligand complex of claim 1, wherein $R_3$ is a straight chain (C8-C12) alkyl.

3. The metal-ligand complex of claim 1, wherein
M is titanium, zirconium or hafnium;
R' and R" are independently of each other (C1-C5) alkyl;
$R_1$ and $R_2$ are independently of each other halogen, (C1-C8) alkyl or (C1-C8) alkoxy; and
M is an integer 3.

4. The metal-ligand complex of claim 1, wherein Chemical Formula 1 is represented by the following Chemical Formula 2:

[Chemical Formula 2]

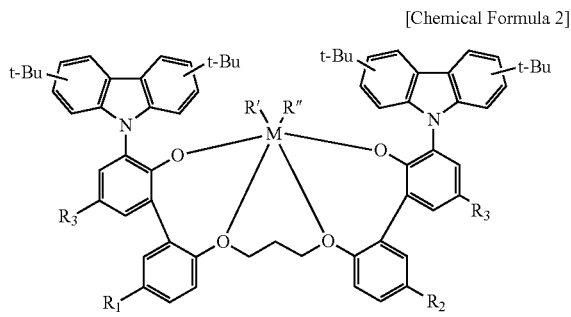

wherein
M is titanium, zirconium or hafnium;
R' and R" are independently of each other (C1-C5) alkyl;
$R_1$ and $R_2$ are independently of each other halogen, (C1-C8) alkyl or (C1-C8) alkoxy; and
$R_3$ is a straight chain (C8-C12) alkyl.

5. A catalyst composition for ethylene-based polymerization comprising:
the metal-ligand complex of claim 1; and
a cocatalyst.

6. The catalyst composition of claim 5, wherein the cocatalyst is an aluminum compound cocatalyst, a boron compound cocatalyst, or a mixture thereof.

7. The catalyst composition of claim 5, wherein the cocatalyst is used at 0.5 to 10000 moles, relative to 1 mol of the metal-ligand complex.

8. A method for preparing an ethylene-based polymer comprising:
polymerizing ethylene or ethylene and α-olefin in the presence of the catalyst composition for ethylene-based polymerization of claim 5 to prepare the ethylene-based polymer.

9. The method of claim 8, wherein the polymerizing is performed at 170 to 250° C.

* * * * *